United States Patent
Baumer et al.

(10) Patent No.: US 7,373,561 B2
(45) Date of Patent: May 13, 2008

(54) INTEGRATED PACKET BIT ERROR RATE TESTER FOR 10G SERDES

(75) Inventors: Howard A Baumer, Laguna Hills, CA (US); Peiqing Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 424 days.

(21) Appl. No.: 10/681,244

(22) Filed: Oct. 9, 2003

(65) Prior Publication Data
US 2004/0083077 A1  Apr. 29, 2004

Related U.S. Application Data

(60) Provisional application No. 60/421,780, filed on Oct. 29, 2002.

(51) Int. Cl.
G06F 11/263  (2006.01)
G06F 11/16  (2006.01)

(52) U.S. Cl. ....................... 714/704; 714/715

(58) Field of Classification Search ............... 714/704, 714/716, 712, 715; 370/252, 389; 702/125
See application file for complete search history.

(56) References Cited

U.S. PATENT DOCUMENTS

| | | | |
|---|---|---|---|
| 4,627,070 A | 12/1986 | Champlin et al. | |
| 4,833,605 A | 5/1989 | Terada et al. | |
| 4,833,695 A | 5/1989 | Greub | |
| 4,967,201 A * | 10/1990 | Rich, III | 342/175 |
| 5,726,991 A * | 3/1998 | Chen et al. | 714/704 |
| 5,793,990 A | 8/1998 | Jirgal et al. | |
| 5,933,021 A | 8/1999 | Mohd | |
| 6,081,570 A * | 6/2000 | Ghuman et al. | 375/368 |
| 6,137,734 A | 10/2000 | Schoner et al. | |
| 6,140,956 A * | 10/2000 | Hillman et al. | 342/357.07 |
| 6,259,693 B1 | 7/2001 | Ganmukhi et al. | |
| 6,317,804 B1 | 11/2001 | Levy et al. | |
| 6,438,717 B1 * | 8/2002 | Butler et al. | 714/704 |
| 6,483,849 B1 | 11/2002 | Bray et al. | |
| 7,032,139 B1 | 4/2006 | Iryami et al. | |

(Continued)

OTHER PUBLICATIONS

International Search Report Issued Dec. 14, 2004 for International Application No. PCT/US03/34234, 5 pages.

(Continued)

*Primary Examiner*—Cynthia Britt
*Assistant Examiner*—Dipakkumar Gandhi
(74) *Attorney, Agent, or Firm*—Sterne, Kessler, Goldstein & Fox P.L.L.C.

(57) ABSTRACT

An integrated packet bit error rate tester includes a packet transmit circuit that has a first memory for storing transmit packet data and is connectable to a channel under test. A packet receive circuit includes a second memory for storing received packet data and is connectable to the channel under test. An interface is used for programming the packet transmit and packet receive circuits. The packet transmit circuit can generate an arbitrary 10G SERDES packet in response to commands from the interface. The packet receive circuit can determine a bit error rate of the channel under test. The second memory can capture received packet data upon any one of (a) after a pre-programmed pattern is detected, (b) after a pre-programmed pattern is lost, and (c) after an error is detected.

50 Claims, 16 Drawing Sheets

U.S. PATENT DOCUMENTS

| | | | |
|---|---|---|---|
| 7,035,228 B2 | 4/2006 | Baumer | |
| 2001/0012288 A1* | 8/2001 | Yu | 370/352 |
| 2001/0015664 A1 | 8/2001 | Taniguchi | |
| 2001/0017595 A1 | 8/2001 | Cliff et al. | |
| 2001/0021953 A1 | 9/2001 | Nakashima | |
| 2002/0054569 A1* | 5/2002 | Morikawa | 370/252 |
| 2003/0009307 A1* | 1/2003 | Mejia et al. | 702/125 |
| 2003/0048781 A1* | 3/2003 | Pierson | 370/389 |
| 2003/0120791 A1 | 6/2003 | Weber et al. | |
| 2003/0172332 A1 | 9/2003 | Rearick et al. | |
| 2004/0088443 A1 | 5/2004 | Tran et al. | |
| 2004/0117698 A1 | 6/2004 | Tran et al. | |
| 2004/0141497 A1 | 7/2004 | Amirichimeh et al. | |
| 2004/0141531 A1 | 7/2004 | Amirichimeh et al. | |
| 2005/0190690 A1 | 9/2005 | Tran | |
| 2006/0250985 A1 | 11/2006 | Baurner | |

OTHER PUBLICATIONS

Alaska Quad-Port Gigabit Ethernet Over Copper Transceivers, from http://www.marvell.com/products/tranceivers/quadport/ . . . , 1 page, printed May 8, 2007.

Alaska X10 Gigabit Ethernet Alaska Gigabit Ethernet Fast Ethernet Physical Layer (PHY) Transceiver Families Provide a Full Range of Ethernet Transceiver Solutions for the Broadband Communications Industry, from http://www.nuhorizons.com/FeaturedProducts/Volume3/Marvell/phy_transceiver.asp, 4 pages, Copyright 2007, printed May 8, 2007.

Cisco Search: Results for "cdl" within "News@Cisco", from http://www.cisco.com/pcgi-bin/search/search.pl, Copyright 1992-2003, printed Jul. 29, 2003.

Industry Breakthrough: Marvell Announces the First Quad-Port Transceiver to Support Both Copper and Fiber-Optic Gigabit Ethernet Interfaces, from Business Wire at www.encyclopedia.com/printable/aspx?id=1G1:68912211, 4 pages, Jan. 9, 2001, printed May 8, 2007.

David Maliniak (ed.), Bel's integrated connector modules support Marvell's Alaska quad Gigabit Ethernet transceiver, from http://www.electronicsweb.com/Content/news/ . . . , 1 page, Dec. 14, 2000, printed May 8, 2007.

Marvell Gets Small, from http://www.lightreading.com/document.asp?doc_id=12004&print=true, 1 page, Feb. 19, 2002, printed May 8, 2007.

Marvell Introduced the Industry's Smallest Quad-Port Gigabit Transceiver Device, Enabling Ultra High Port Density Enterprise Switching Systems, from http://www.marvell.com/press/pressNewsDisplay.do?releaseID-41, 3 pages, Feb. 19, 2002, printed May 8, 2007.

Ed Turner, David Law, Sep. 17-19, 2001, "IEEE P802.3ae MDC/MDIO", http://www.leee802.org/3/efm/public/sep01/turner.sub.—1.sub.—0901.pdf.

Q&A: Hiroshi Suzuki on Extending Ethernet Beyond the LAN, from http://newsroom.cisco.com/dlls/innovators/optical/hiroshi_suzuki_qa.html, 2 pages, Copyright 1992-2003, printed Jul. 29, 2003.

IEEE Std. 802.3, Part 3: Carrier Sense Multiple Access with Collision Detection (CSMA/CD) access method and physical layer specifications, Section Two, pp. 9-55, Copyright 2002.

IEEE Std. 802.3, Part 3: Carrier Sense Multiple Access with Collision Detection (CSMA/CD) access method and physical layer specifications, Section Four, pp. 9-152, Copyright 2005.

Cisco Systems, Hiroshi Suzuki: Taking Ethernet Beyond the LAN, http://newsroom.cisco.com/dlls/innovators/optical/hiroshi_suzuki_profile.html.

Cisco Systems, Q&A: Hiroshi Suzuki on Extending Ethernet Beyond the LAN, http://newsroom.cisco.com/dlls/innovators/optical/hiroshi_suzuki_qa.html.

Cisco Systems, Innovators Profiles, http://newsroom.cisco.com/dlls/innovators/inn_profiles.html.

Cisco Systems, Optical, http://newsroom.cisco.com/dlls/innovatros/optical/.

Cisco Systems, Cisco Systems ad Aretae Interactive Launch Internet Powered Property (IP2), http://newroom.cisco.com/dlls/global/asiapac/news/2000/pr_07-25.html.

"Broadcom Announces the First 0.13-micron CMOS Multi-Rate Gigabit Octal Serializers/Deserializers" [online], Broadcom Press Release, Oct. 29, 2002 [retrieved on Jul. 16, 2003]. Retrieved from the Internet: <URL: http://www.broadcom.com/cgi-bin/pr-prps.cgi?pr_id=PR021029>(5 pages).

BCM8040 8-Channel Multi-rate 1.0-3.2-GBPS Retimer Switch [online], Broadcom Products Site Guide [retrieved on Jul. 16, 2003]. Retrieved from the Internet: <URL: http://www.broadcom.com/products/8040.html> (2 pages).

8-Channel Multi-Rate CMOS Retimer with Full Redundancy [online], BCM8040 Product Brief, Broadcom Corporation (2002) [retrieved on Jul. 16, 2003]. Retrieved from the Internet:<URL: http://www.broadcom.com/products/8040.html> (2 pages).

BCM8020 8-Channel Multi-rate 1.0-3.2-GBPS Transceiver [online], Broadcom Products Site Guide [retrieved on Jul. 16, 2003]. Retrieved from the Internet: <URL: http://www.broadcom.com/products/8020.html> (2 pages).

8-Channel Multi-Rate CMOS Transceiver with Full Redundancy [online], BCM8020 Product Brief, Broadcom Corporation (2002) [retrieved on Jul. 16, 2003]. Retrieved from the Internet: <URL: http://www.broadcom.com/products/8020.html> (2 pages).

BCM8021 4-Channel Multi-rate 1.0-3.2-GBPS Transceiver with High-Speed Redundancy [online], Broadcom Products Site Guide [retrieved on Jul. 16, 2003]. Retrieved from the Internet: <URL: http://www.broadcom.com/products/8021.html> (2 pages).

4-Channel Multirate 1.0-3.2-GBPS Transceiver with High-Speed Redundancy [online], BCM8021 Product Brief, Broadcom Corporation (2002) [retrieved on Jul. 16, 2003]. Retrieved from the Internet: <URL: http://www.broadcom.com/products/8021.html> (2 pages).

Broadcom Announces the Industry's First 0.13-micron CMOS Advanced Transciver Solution with Signal Conditioning for Low-Cost 10-Gigabit Over Copper Links [online], Broadcom Press Release, Apr. 29, 2003 [retrieved on Jul. 16, 2003]. Retrieved from the Internet: <URL: http://www.broadcom.com/cgi-bin/pr/prps/cgi?pr_id=PR030429A> (4 pages).

* cited by examiner

INTEGRATED PACKET BIT ERROR RATE TESTER FOR 10G SERDES

CROSS-REFERENCE TO RELATED APPLICATIONS

This application claims priority to U.S. Provisional Patent Application No. 60/421,780 Filed: Oct. 29, 2002, Titled: A MULTI-RATE, MULTI-PORT, GIGABIT SERDES TRANSCEIVER, which is incorporated by reference herein.

BACKGROUND OF THE INVENTION

1. Field of the Invention

The present invention generally relates to serializer/de-serializer integrated circuits with multiple high-speed data ports, and more particularly to a serializer/de-serializer chip that includes the functionality to switch between multiple high-speed data ports.

2. Background Art

High-speed data links transmit data from one location to another over transmission lines. These data links can include serializer/deserializer data links (i.e. SERDES) that receive data in a parallel format and convert the data to a serial format for high-speed transmission. SERDES data links can be part of a backplane in a communications system.

In a high-speed back plane configuration, it is often desirable to switch between multiple SERDES links. In other words, it is often desirable to switch between any one of multiple SERDES links to another SERDES link, and to do so in a low power configuration on a single integrated circuit.

BRIEF SUMMARY OF THE INVENTION

A multi-port SERDES transceiver includes multiple parallel ports and serial ports, and includes the flexibility to connect any one of the parallel ports to another parallel port or to a serial port, or both. Furthermore, the multi-port transceiver chip can connect any one of the serial ports to another serial port or to one of the parallel ports. The multi-port SERDES transceiver is able to operate at multiple data rates.

The multi-port SERDES transceiver also includes a packet bit error rate tester (BERT). The packet BERT (or PBERT) generates and processes packet test data that can be transmitted over any of the serial ports to perform bit error testing. The packet BERT can monitor (or "snoop") between the serial ports. In other words, if data is being transmitted from one serial port to another serial port, the packet BERT can capture and store a portion of this data for bit error testing.

The substrate layout of the multi-port SERDES transceiver chip is configured so that the parallel ports and the serial ports are on the outer perimeter of the substrate. A logic core is at the center of the substrate, where the logic core operates the serial and parallel data ports, and a bus that connects the data ports. The bus can be described as a "ring" structure (or donut "structure") around the logic core, and is configured between the logic core and the data ports. The ring structure of the bus provides efficient communication between the logic core and the various data ports.

In one aspect, there is provided an integrated packet bit error rate tester including a packet transmit circuit that has a first memory for storing transmit packet data and is connectable to a channel under test. A packet receive circuit includes a second memory for storing received packet data and is connectable to the channel under test. An interface is used for programming the packet transmit and packet receive circuits. The packet transmit circuit can generate an arbitrary 10G SERDES packet in response to commands from the interface. The packet receive circuit can determine a bit error rate of the channel under test. The second memory can capture received packet data upon any one of (a) after a pre-programmed pattern is detected, (b) after a pre-programmed pattern is lost, and (c) after an error is detected.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
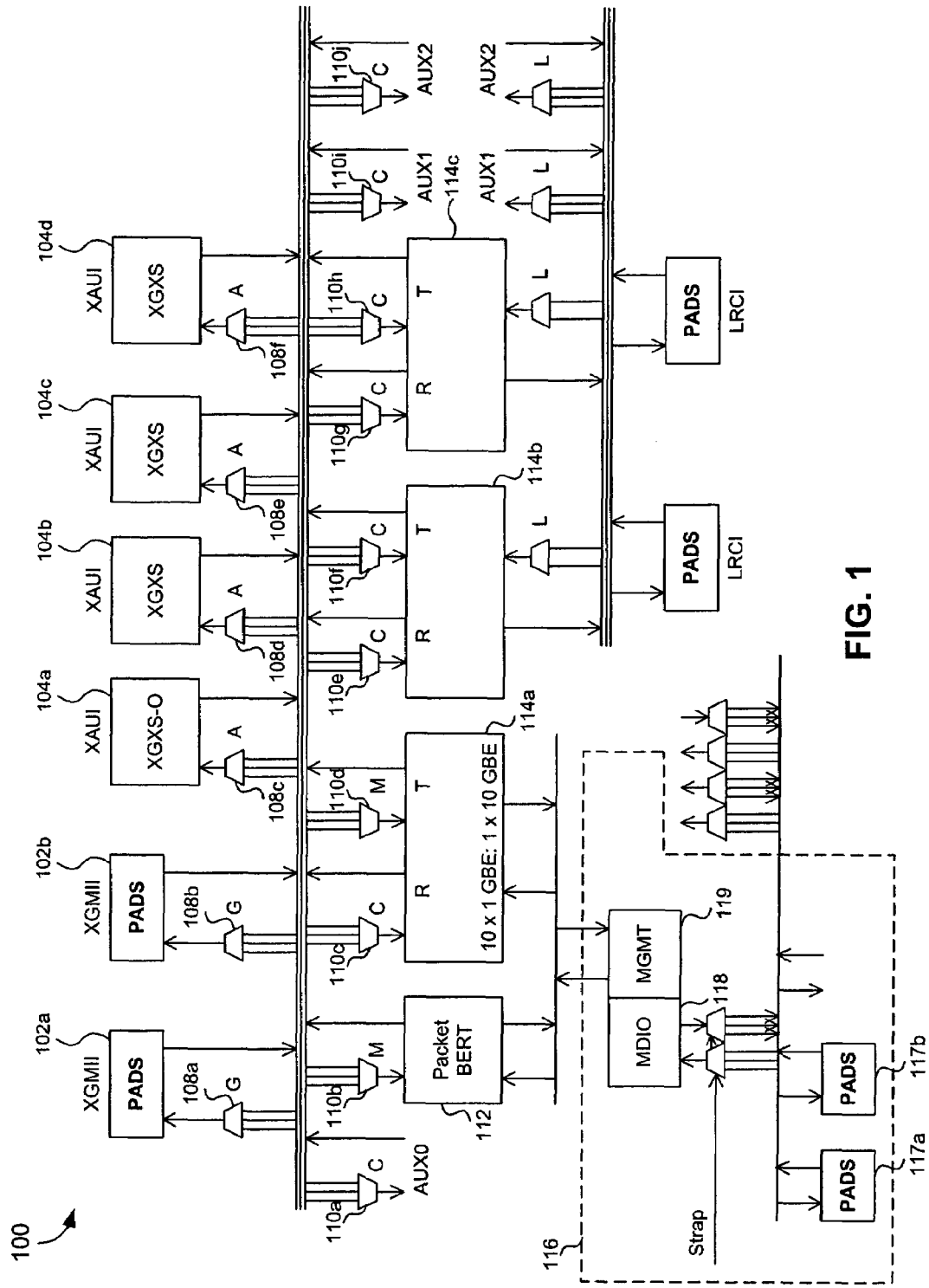
FIG. 1 illustrates a multi-port SERDES chip according to embodiments of the present invention.

FIG. 1 illustrates a multi-port SERDES transceiver 100 according to embodiments of the present invention. The SERDES transceiver 100 includes multiple parallel ports and serial ports, and includes the flexibility to connect any one of the parallel ports to another parallel port or to a serial port, or both. Furthermore, the multi-port transceiver chip 100 can connect any one of the serial ports to another serial port or to one of the parallel ports.

More specifically, the SERDES transceiver chip 100 includes two parallel transceiver ports 102a, 102b and (in this particular example) four serial transceiver ports 104a-d. Other configurations having a different number of ports could be used. The parallel transceiver ports 102a, 102b transmit and receive data in a parallel format. The parallel transceiver ports 102a, 102b can be XGMII parallel ports (or another type of parallel port), for example, where the XGMII transceiver protocol is known to those skilled in the arts. Each XGMII port 102 can include 72 pins, for example, operating at 1/10 the data rate of the serial ports 104.

The four serial ports 104a-104d can be XAUI serial ports (or other types of serial ports), and transmit and receive data in a serial format. Each serial port 104 can be a quad serial port having four serial data lines using the XAUI protocol that is known to those skilled in the arts. In embodiments of the invention, the serial ports 104 can operate at data rates of, for example, 3.125 GHz, 2.5 GHz, and 1.25 GHz. In other words, the transceiver chip 100 is a multi-rate device. However, the XAUI data rates above are effectively quadrupled since there are four serial data lines in each serial port 104. The serial ports 104 can be further described as a 10 Gigabit extension sub-layer (XGXS).

The parallel data ports 102 and the serial data ports 104 may be differential.

The parallel ports 102 and the serial ports 104 are linked together by a bus 106. The bus 106 enables data to travel between all the ports 102 and 104. More specifically, the bus 106 enables data to travel from one parallel port 102 to another parallel port 102, and to travel from one parallel port 102 to a serial port 104. Multiplexers 108 connect the bus 106 to the parallel ports 102 and to the serial ports 104. The serial port 104 performs a parallel to serial conversion when receiving parallel data that is to be sent out serial. Likewise, the bus 106 enables data to travel from one serial port 104 to another serial port 104, and to travel between a serial port 104 and a parallel port 102. The parallel port 104 (or optionally the ports 102) performs a serial-to-parallel conversion when receiving serial data that is to be sent out in parallel. The multi-port SERDES transceiver 100 is highly flexible in being able to connect multiple parallel ports 102 to multiple serial ports 104, and vice versa.

The SERDES transceiver chip 100 can be implemented on a single CMOS substrate. For example, the SERDES transceiver chip 100 can be implemented using a low power 0.13-micron CMOS process technology, which lends itself to higher levels of integration and application.

The transceiver 100 enables dual unit operation, where one parallel port 102 is paired up with two of the serial ports 104, and the other parallel port 102 is paired up with the other two serial ports 104. For example, parallel port 102a can be paired with serial ports 104a and 104b. Likewise, the parallel port 102b can be paired with serial ports 104c and 104d. However, there is complete selectivity of the ports that are grouped together for dual unit operation. For example, parallel port 102a can be paired with either serial ports 104a and 104b, or serial ports 104c and 104d. In a backplane configuration, this provides flexibility to connect a parallel port to one or more serial ports, and with redundancy.

The transceiver 100 also includes a packet bit error rate tester (packet BERT, or PBERT) 112. The packet BERT 112 generates and processes packet test data that can be transmitted over any of the serial ports 104 to perform bit error testing. Any type of packet data can be generated to perform the testing at different data rates. For example, the packet BERT 112 can generate packet data that can be used to test the SERDES data link. As such, the packet BERT 112 provides a built-in self-test for the SERDES data link. The packet BERT 112 generates test data that is sent over one or more of the serial ports 104 using the bus 106 to perform the bit error rate testing of the SERDES data link. Likewise, the packet BERT 112 can capture test data received over any one of the serial ports 104 or parallel ports 102 using the bus 106 for comparison with test data that was sent out. A bit error rate can then be determined based on this comparison.

In one embodiment, the packet BERT 112 is RAM-based, so that the test data is stored and compared in a RAM memory to perform the bit error rate test. In another embodiment, the packet BERT 112 is logic-based so that the test data is generated by a logic function, and transmitted across a SERDES link. Upon receipt back, the test data is re-generated by the logic of the packet BERT 112, for comparison with the original test data that was sent over the SERDES data link. A RAM-based packet BERT 112 is generally more flexible than a logic-based packet BERT 112, because there is no limitation on the data that can be stored in the RAM packet BERT 112. However, a logic packet BERT 112 is more efficient in terms of substrate area because a RAM occupies more area than a logic circuit.

Since the packet BERT 112 shares the same bus 106 with the serial ports 104, the packet BERT 112 can monitor (or "snoop") between the serial ports 104. In other words, if data is being transmitted from one serial port 104 to another serial port 104, the packet BERT can capture and store a portion of this data for bit error testing, usually after a specified sequence of events or data patterns. In one embodiment, the packet BERT 112 "blindly" captures data being sent from one serial port 104 to another serial port 104. In another embodiment, the packet BERT 112 starts capturing data after a particular byte of data is transmitted. In another embodiment, the packet BERT 112 starts capturing data after an error event occurs.

The SERDES transceiver chip 100 also includes the ability to include other optional logic blocks 114 that are not necessary for the operation of the SERDES transceiver. In other words, these could be customer-driven logic blocks or some other type of logic block. These optional logic blocks 114 can transmit and receive data over the serial ports 104 or parallel ports 102 using the bus 106. The packet BERT 112 and the optional blocks 114 connect to the bus 106 using the multiplexers 110.

The SERDES transceiver chip 100 also includes a management interface 116 that enables the configuration of the portions (parallel ports 102, series port 104, packet BERT 112, and optional logic blocks 114) of the transceiver chip 100. The management interface 116 includes two pads 117 that enable two different management chips to program and control the portions of the transceiver chip 100. For example, one management chip connected to pad set 117a could control the parallel port 102a and the serial ports 104a and 104b, and another management chip connected to pad set 117b could control the parallel port 102b and the serial ports 104c and 104d. The management interface 116 is configured to be compatible with both IEEE clause 45 and the IEEE clause 22 management standards. The management interface 116 also includes an MDIO (media independent input/output) interface 118, discussed further below.

Figure 2:
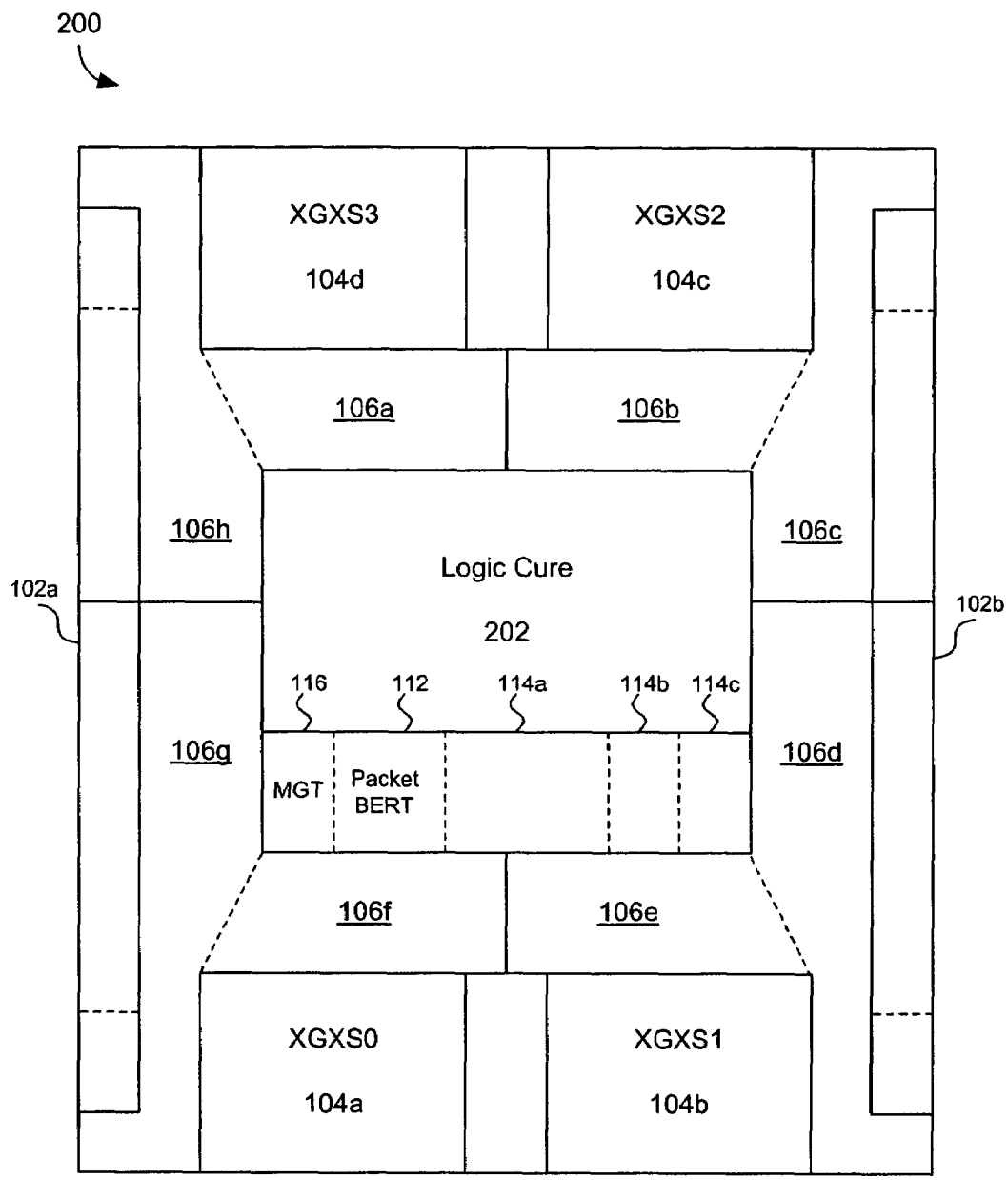
FIG. 2 illustrates a substrate layout of the multi-port SERDES transceiver chip according to embodiments of the present invention.

FIG. 2 illustrates a substrate layout 200 for the SERDES transceiver 100 according to one embodiment of the invention. The substrate layout 200 is configured to minimize the substrate area of the transceiver 100, and to efficiently provide the port interconnections described above.

The substrate layout 200 is configured so that the parallel ports 102a, 102b and the serial ports 104a-104d are on the outer perimeter of the substrate 200, as shown. A logic core 202 is at the center of the substrate 200, where the logic core 202 operates the bus 106 and the serial 104 and parallel 102 data ports. The management interface 116, the packet BERT 112, and the optional logic blocks 114a-114c are adjacent to the logic core 202 as shown. The bus 106 can be described as a "ring" structure (or donut "structure") around the logic core 202, and placed in between the logic core 202 and the data ports 102 and 104 that occupy the parameter of the substrate layout 200. Furthermore, the ring structure of the bus 106 also provides efficient communication between the logic core 202 and the various data ports 102 and 104. Furthermore, the ring structure of the bus 106 also provides efficient communication between the management interface 116, the packet BERT 112, the optional logic blocks 114, and the various data ports 102 and 104.

The bus 106 is illustrated as eight sections 106a-106g, for ease of illustration. Each section provides an interface to the respective data ports 102 or 104 that are adjacent to the respective sections.

Figure 3:
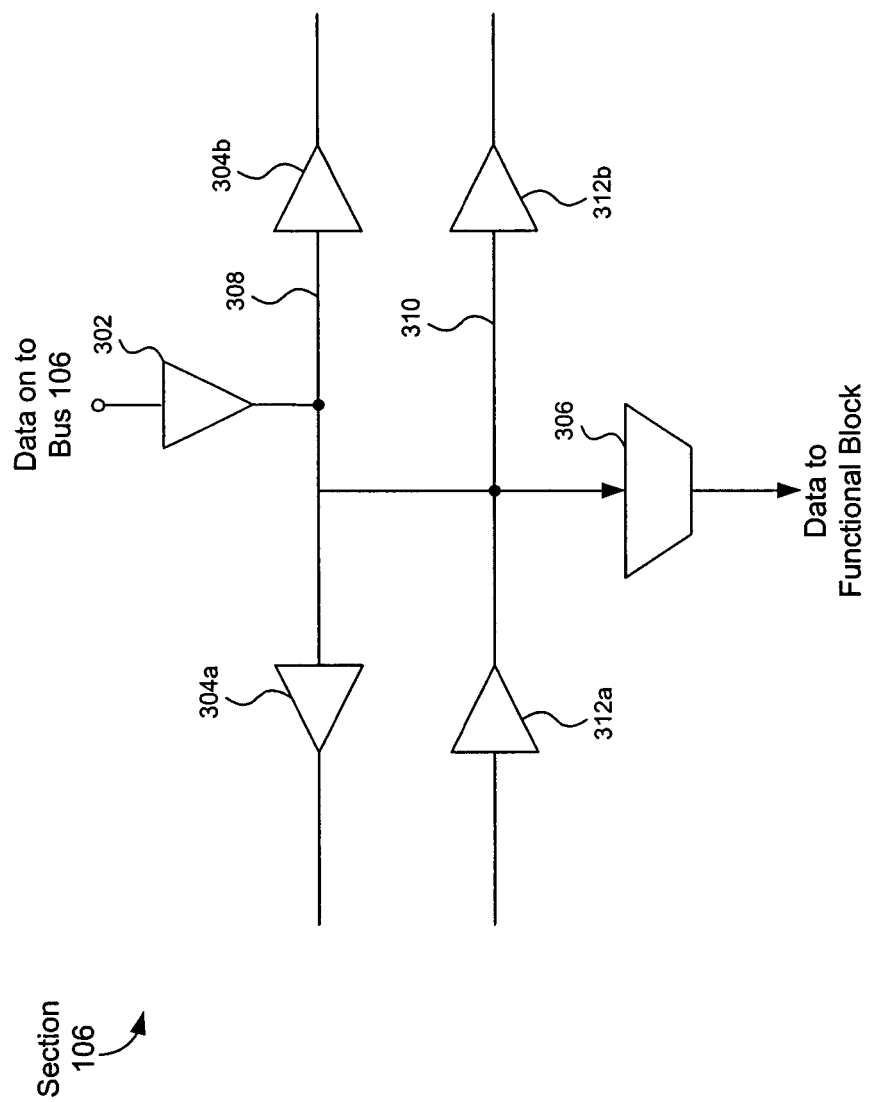
FIG. 3 further illustrates sections of the bus on the transceiver chip according to embodiments of the present invention.

FIG. 3 represents one of the eight sections 106a-106g of the bus 106 according to an embodiment of the present invention. Each section of the bus 106 can be represented as two paths 308 and 310. Data enters the bus 106 through a buffer 302 and proceeds to its destination along the path 308 and through the buffers 304. Once on the bus 106, data passes from one section to another section of the bus 106 using the path 310 and passing through the buffers 312. The MUX 306 represents data passing from the bus 106 to a functional block, such as a data port 102, 104 or the packet BERT 112. The actual wires and buffers on the bus 106 are matched to minimize signal distortion.

The data wires in the bus 106 are preferably deposited on the substrate 200 in a particular fashion. Namely, a power, ground or DC signal is placed between adjacent (or near-by) data wires. Furthermore, adjacent data wires on the bus 106 are placed on two separate layers. Therefore, a power or ground will be above or below a data wire, and adjacent to a data wire. Therefore, two nearby data wires will not be located directly adjacent one another, but instead will be positioned diagonal to each other, thereby reducing crosstalk.

The multi-port SERDES transceiver 100 supports multiple different data protocols at the pads, including: XGMII, TBI, RTBI, HSTL, SSTL, LVTTL protocols, etc.

Figure 4:
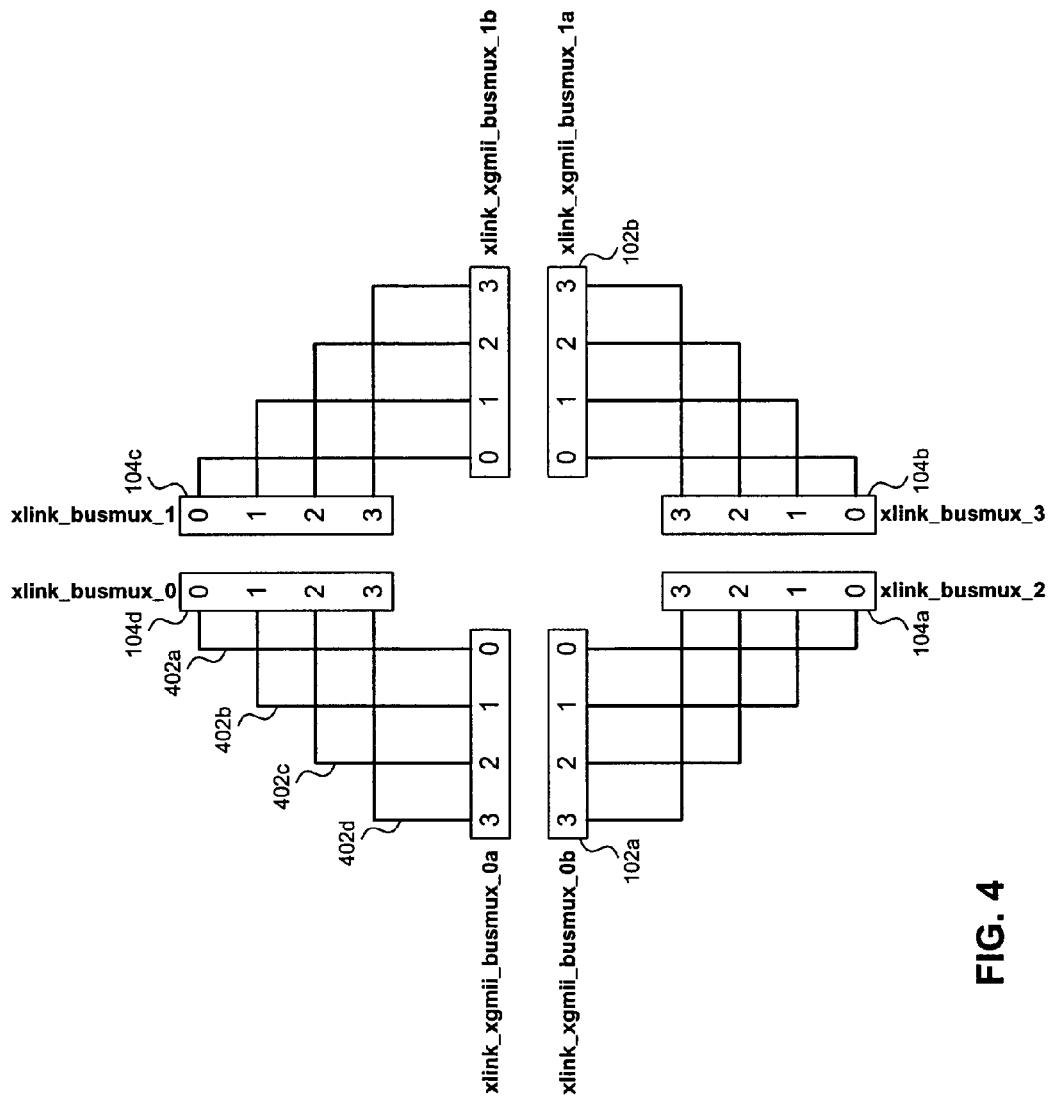
FIG. 4 illustrates the path lengths of wires in the bus according to embodiments of the present invention.

FIG. 4 further illustrates an example layout of the bus 106. The wires 402 between data ports 102, 104 are configured to have the same path lengths. In other words, wires 402a-402d are deposited so as to have the same path length so as to reduce delay differences between signals.

The multi-port SERDES transceiver 100 includes the ability to change the timing of the data ports 102. This includes the ability to change the timing between the data and clock signals. In other words, the registers in the data ports 102 can be re-programmed to operate at different timing protocols.

The MDIO interface 118 is a parallel bus interface between a top-level MDIO management block 119 and the PBERT 112. The PBERT 112 can be programmed and its RAM loaded through the MDIO interface 118. The MDIO interface 118 includes a transmit (TX) MDIO interface 118A, and a receive (RX) MDIO interface 118B (not shown).

There are two sets of registers (see FIGS. 5A-5B) that are used for programming, loading the RAM, and reading all the status bits and the different Bit-Error-Rate-Test counters of the PBERT_TX 550 and the PBERT_RX 560 separately. These registers are inside the MDIO interface block 118A for the PBERT_TX 550 and the MDIO interface block 118B for the PBERT_RX 560. By programming a corresponding bit of the Block Address Register (not shown) within the MDIO management block 119, either the PBERT_TX 550, or the PBERT_RX 560 can be selected for access. Both can be selected for programming, which is especially useful when the PBERT 112 RAM is loaded for pattern generation and pattern self-checking. In this case, the same content is loaded in both RAMs 507, 521 (see FIGS. 5A-5B) in the PBERT_TX 550 and the PBERT_RX 560.

The access to the PBERT 112 RAM (PBERT_TX_RAM 507 or PBERT_RX_RAM 521) is through two special registers that are inside both of the 118A and 118B. One of the registers is a RAM address control register (not shown in the figures), which is used to specify the RAM 507, 521 address. The other register is a RAM data register (not shown in the figures, also inside the MDIO interfaces 118A and 118B), which is used to read/write to/from the RAM. Since each RAM word is 85 bits, additional logic is needed to facilitate the RAM access.

Each RAM read or write involves six consecutive reads or writes to the RAM data register after programming the RAM address register. An internal RAM address counter 503 (see FIG. 5C) is incremented every time the RAM data register is accessed. After six reads or writes, the RAM address counter 503 generates a pulse to initiate the actual RAM read or write, and then self-clears its counter value. The RAM address register is also incremented when the RAM address counter reaches six, so there is no need to program the RAM address register every time during the PBERT RAM loading, when a continuous RAM address space is used for programming.

Since six consecutive reads or writes are required for each RAM access, there is additional logic to auto-clear the RAM address counter 502 every time the RAM address register is programmed. This ensures that any illegal RAM access can be corrected (i.e., fewer than six reads or writes in the RAM data register) without resetting the whole PBERT 112.

Figure 5A:
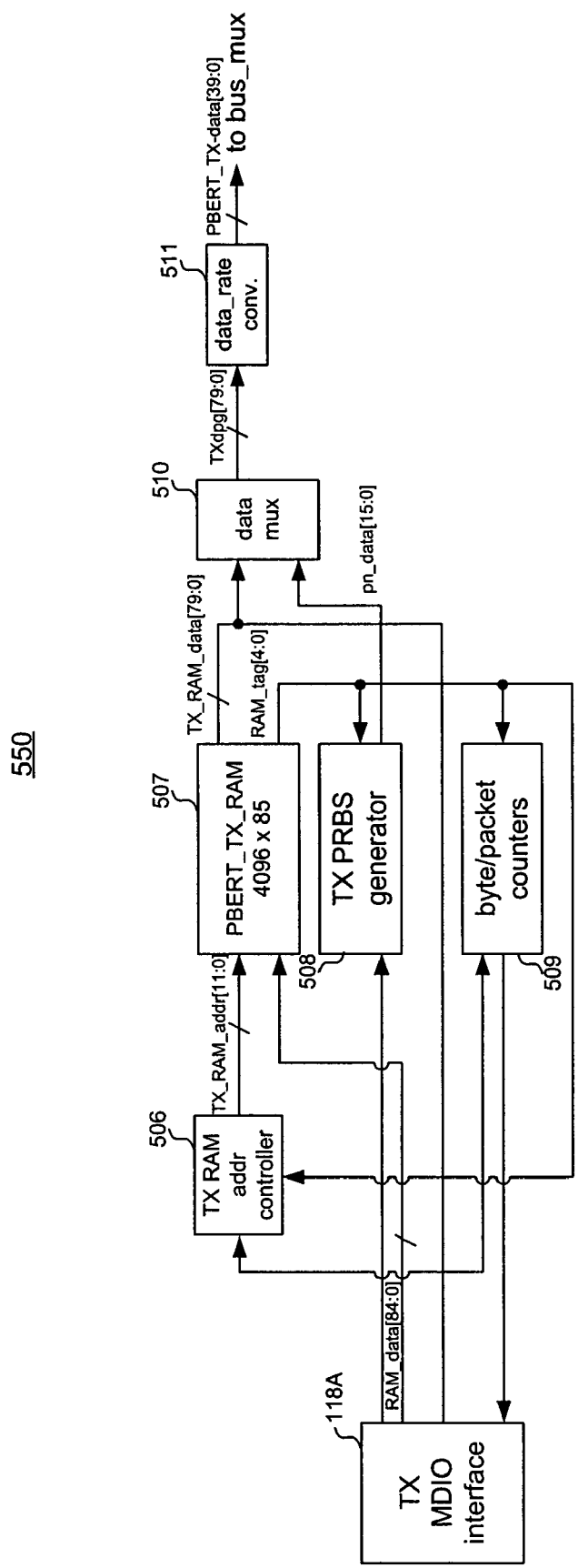
FIG. 5A illustrates a transmit path of the packet bit error rate tester (PBERT).

FIG. 5A is a block diagram of the transmit path of the PBERT 112, designated as PBERT_TX 550 in the figures. As shown in FIG. 5A, the TX MDIO interface 118A interfaces with a TX PRBS (pseudo random binary sequence) generator 508 and with the PBERT_TX_RAM 507. The TX MDIO interface 118A receives outputs of the PBERT_TX_RAM 507 (designated TX_RAM_data [79:0]) and an output of a byte/packet counter 509. A TX RAM address controller 506 outputs a RAM address TX_RAM_addr[11:0] to the PBERT_TX_RAM 507. A data mux 510 receives inputs from the PBERT_TX_RAM 507 and the TX PRBS generator 508. Its output TXdpg[79:0] is inputted into a data rate converter 511, and is then outputted to a bus multiplexer 106 as PBERT_TX_data[39:0].

Figure 5B:
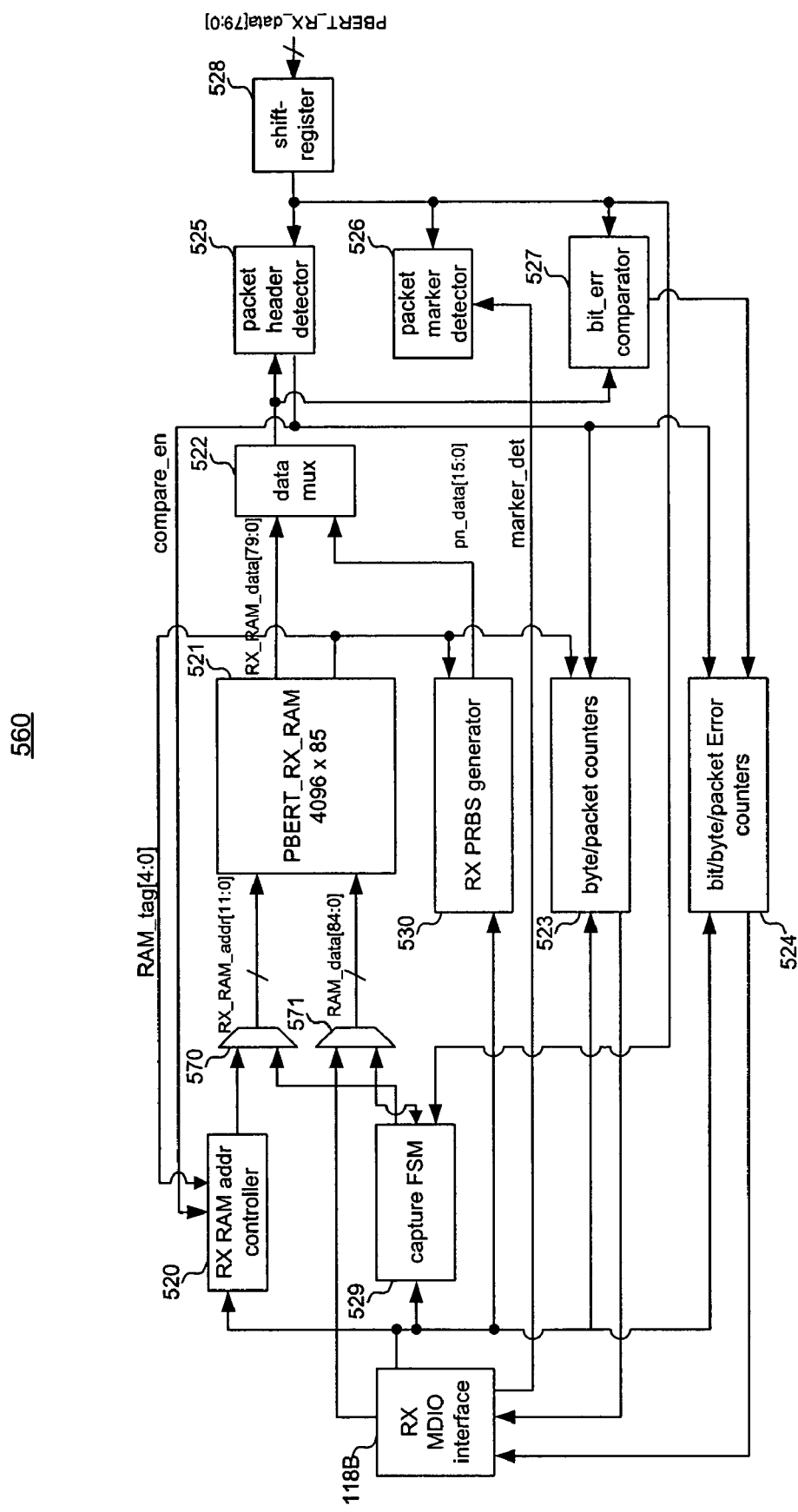
FIG. 5B illustrates the receive path of the PBERT.

FIG. 5B illustrates the receive path of the PBERT 112, designated as PBERT_RX 560 in FIG. 5B. As shown in FIG. 5B, PBERT_RX_data[79:0] enters a shift register 528. The shift register 528 outputs the data to a packet header detector 525, to a packet marker detector 526, and to a bit error comparator 527. The Packet Header Detector 525 generates the compare_en signal, which is input into an RX RAM address controller 520, the Packet Marker Detector 526, a bit/byte/packet error counter 524. The RX MDIO interface 118B receives inputs from the PBERT_RX_RAM 521, from the byte/packet counter 523, and from the bit/byte/packet error counter 524. The RX MDIO interface 118B also interfaces with the RX RAM address controller 520, a capture Finite State Machine (FSM) 529, and the RX PRBS generator 512. Multiplexers 570, 571 are used to provide inputs to the PBERT_RX_RAM 521, which in turn interfaces with the data mux 522 and the RX PRBS generator 512.

Figure 5C:
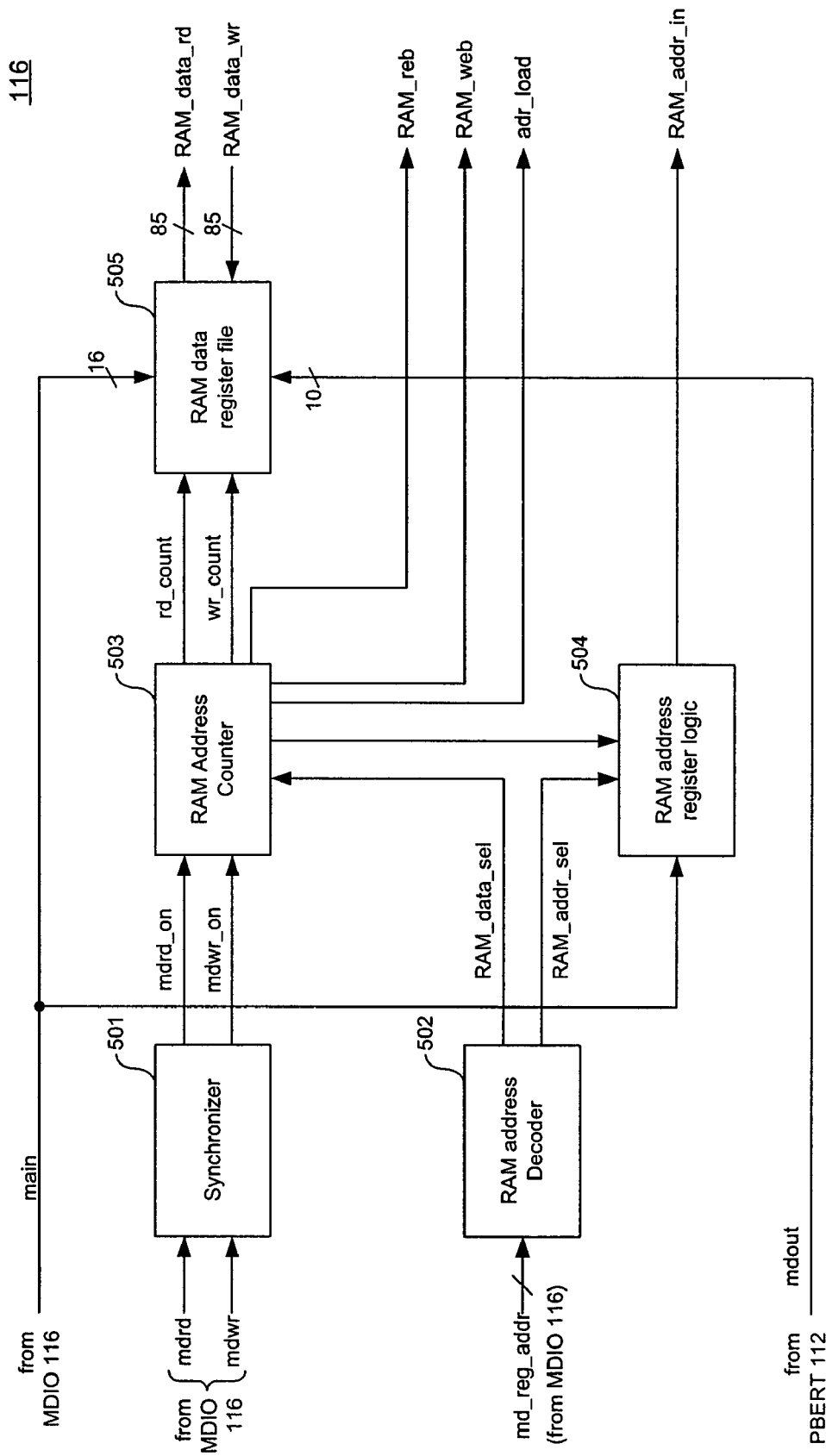
FIG. 5C illustrates PBERT RAM access.

FIG. 5C is a block diagram showing the RAM access. The MDIO signals entering the PBERT 112 are asynchronous, and are running at much lower clock frequency. In a synchronizer 501, the MDIO read and write signals are re-synchronized through a multi-stage shift register, and the signals from the shift register are used to generate synchronous read and write enable pulses to increment the RAM address counter 503. The counter values of the RAM address counter 503 are used as an index to store the data into a dual-port register file 505 that buffers and aligns each 16 bits of MDIO data with the actual 85 bits of RAM data.

The MDIO address decoder 502 takes as input md_r-eg_addr and generates different select signals to enable the RAM address counter 503, the RAM address register logic 504 and other PBERT data and control registers (not shown).

The RAM address register logic 504 can be loaded with MDIO data when MDIO address (md_reg_addr) selects the RAM address register, and afterwards it can be incremented by a pulse generated from the RAM address counter 503 when it counts six reads or writes. The RAM address counter 503 also generates similar pulses for RAM read and write control when it counts six reads or writes.

There are two identical RAMs used in the PBERT 112, one is the PBERT_TX_RAM 507 in the PBERT_TX 550, which is used to generate the 10G packet for bit error rate testing. The other is the PBERT_RX_RAM 521 in the PBERT_RX 560, and is used to generate the same pattern that is loaded in the PBERT_TX 550 when the PBERT_RX 560 is used to check the received packets. The PBER-T_RX_RAM 521 is also used to capture the received packets when the PBERT 112 is programmed in its different capture modes (discussed below).

The PBERT RAMs 507, 521 are mini-script RAMs, which can be loaded with a simple set of script instructions, along with the data of the packets, and each script instruction is used to control how the data is used to generate a real-time 10G packet.

Each word of each RAM has a 5-bit Op-code, called tag[4:0], and 80 bits of data for each lane of SERDES, as illustrated in the table below:

TABLE 1

| Op Code (tag-field) | High-byte of Lane 3 | High-byte of Lane 2 | High-byte of Lane 1 | High-byte of Lane 0 | Low-byte of Lane 3 | Low-byte of Lane 2 | Low-byte of Lane 1 | Low-byte of Lane 0 |
|---|---|---|---|---|---|---|---|---|
| 84:80 | 79:70 | 69:60 | 59:50 | 49:40 | 39:30 | 29:20 | 19:10 | 9:0 |

Each 10G packet has 40 bits data for every cycle of the SERDES clock, 10 bits for each lane. Since the PBERT 112 is running at half rate of SERDES clock (though other options are possible, such as nX SERDES clock rate, or 1/Nx SERDES clock rate), two bytes are stored for each lane, and these 80-bits of data can be converted into two 10G data words by a 2x clock of the PBERT 112.

A sample set of script instructions is depicted in the following table:

TABLE 2

| Tag Field and its operation | |
|---|---|
| Tag[4:0] | Operation |
| x_x_x_0_0 | Increment RAM address (could be a NOP) |
| x_x_x_0_1 | Jump to RAM address 0 |
| x_x_x_1_0 | Send n IPG code group, n = RAM data[15:0] |
| x_x_x_1_1 | Send n PN data from PRBS, n = RAM data[15:0] |
| x_x_0_x_x | Do not load PRBS seed when sending PN data |
| x_x_1_x_x | Load PRBS seed when sending PN data |
| x_0_x_x_x | Not a valid packet byte (not in the packet) |
| x_1_x_x_x | A valid packet byte (in the packet) |
| 0_x_x_x_x | No conditional stop |
| 1_x_x_x_x | Conditional stop when run-bit is de-asserted |

In the above table, only the special meaning for each tag bit is specified, and an "x" is placed on other tag bit, which can be set to 0 or 1 according to their definitions when the PBERT RAMs 507, 521 are programmed. That means that the 5-bit tag can be used by combining each operation of its individual tag bits. For example, if tag[4:0] =0_0_0_0_0, it will instruct the RAM address control block 506 to increment current RAM address without sending a valid packet data (it will just send the RAM data without counting it as part of the packet) and it is actually a NOP command.

Tag[1:0] is actually used to control how the RAM address will be changed during pattern generation and self-checking, which will be explained in detail below, in the description of RAM address control block 506 and 520.

When the tag bits are programmed to send IPG or a pseudo-random number, the RAM_data[15:0] is actually the loop count value for the IPGs that have to be send, or how many cycles the pseudo-random number counter has to run to send PRBS data into each lane. Other RAM data bits are not used and can be programmed to be all 0.

Tag[2] is used to control whether the seed is loaded from a programmed seed register every time the PN data is looped from this RAM address.

In actual packet generation, Jump to RAM address 0 is used at the end of RAM loading to repeat the packet (which could be a combination of IPG, data packet and PRBS data) until the PBERT 112 is stopped.

Table 3 is an example of PBERT RAM programming to send a 10G data packet.

TABLE 3

| PBERT RAM programming | | | | | | | | |
|---|---|---|---|---|---|---|---|---|
| Tag[4:0] | [79:70] | [69:60] | [59:50] | [49:40] | [39:30] | [29:20] | [19:10] | [9:0] |
| 10000 | I | I | I | I | I | I | I | I |
| 00000 | I | I | I | I | I | I | I | I |
| 00000 | I | I | I | I | I | I | I | I |
| 01000 | D7 | D6 | D5 | D4 | D3 | D2 | D1 | SOP |
| 01000 | D15 | D14 | D13 | D12 | D11 | D10 | D9 | D8 |

TABLE 3-continued

PBERT RAM programming

| Tag[4:0] | [79:70] | [69:60] | [59:50] | [49:40] | [39:30] | [29:20] | [19:10] | [9:0] |
|---|---|---|---|---|---|---|---|---|
| 01000 | EOP | D22 | D21 | D20 | D19 | D18 | D17 | D16 |
| 00000 | I | I | I | I | I | I | I | I |
| 00000 | I | I | I | I | I | I | I | I |
| 01011 | 0 | 0 | 0 | 0 | 0 | 0 | 0 | 16 |
| 00001 | I | I | I | I | I | I | I | I |

The PBERT RAM will therefore generate the pattern that appears on each of the 4-lane as follows:

Lane0: I, I, I, I, I, I, SOP, D4, D8, D12, D16, D20, I, I, I, I, PN0, PN1, . . . PN15, I, I . . .

Lane1: I, I, I, I, I, I, D1, D5, D9, D13, D17, D21, I, I, I, I, PN0, PN1, . . . PN15, I, I . . .

Lane2: I, I, I, I, I, I, D2, D6,D10, D14, D18, D22, I, I, I, I, PN0, PN1, . . . PN15, I, I . . .

Lane3: I, I, I, I, I, I, D3, D7,D11, D15, D19, EOP, I, I, I, I, PN0, PN1, . . . PN15, I, I . . .

These patterns can be repeated again and again until a stop bit is programmed, or until the run bit in the PBERT address register is de-asserted.

In the PBERT 112 design, the RAM address control blocks 506 and 520 are also used to turn on and off the PBERT 112 operations. When the PBERT 112 is turned on, it controls the RAM address update based on the RAM_tag values and the loop counter results. It also generates the RAM address during MDIO 118 access of the PBERT RAMs 507, 521.

Figure 6:
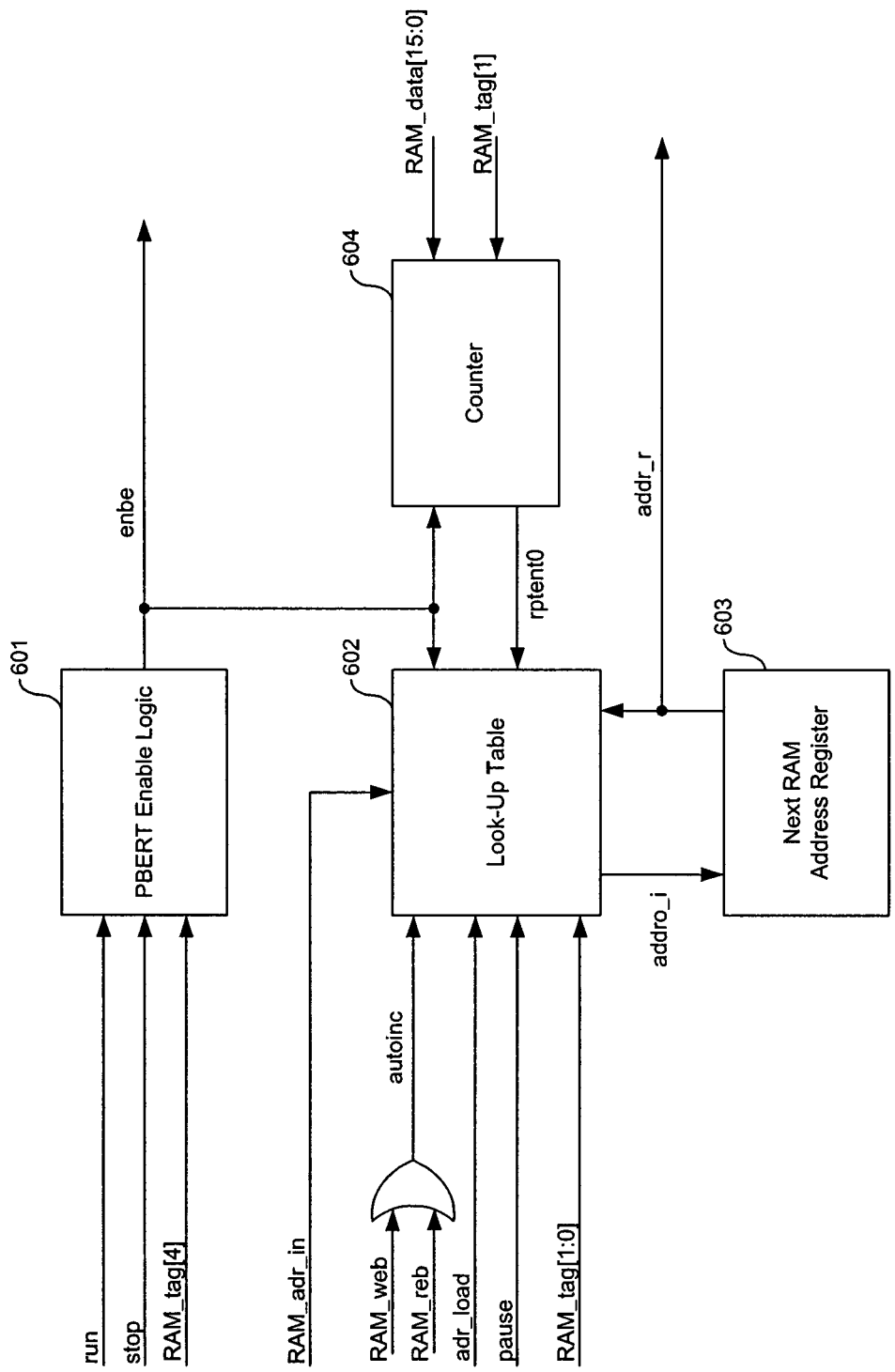
FIG. 6 is a block diagram of a RAM address control block.

FIG. 6 is a simplified block diagram of TX RAM address controller 506 and RX RAM address controller 520. PBERT Enable logic 601 is used to generate the PBERT 112 enable signal enbe. When enbe is HIGH, the PBERT TX 550 or the PBERT_RX 560 will be turned on, and when enbe is LOW, the PBERT_TX 550 or the PBERT_RX 560 will be turned off. The PBERT Enable logic 601 has three input signals: run, stop, and RAM_tag[4]. The run and stop are control bits that can be programmed from the MDIO interface 118A and 118B separately.

The run control bit will initially set the PBERT_TX 550 or PBERT_RX 560 enable signal enbe, and the stop control bit will disable the PBERT_TX 550 or the PBERT_RX 560 by setting enbe to LOW. The RAM_tag[4] bit can also be used to conditionally stop the PBERT_TX 550 or PBER-T_RX 560 without using the stop control bit: this feature allows generating a pre-determined packet by setting RAM_tag[4] at some particular RAM address when loading the PBERT RAM 507, 521. The run bit can then be cleared at any time, and the PBERT_TX 550 will continue to generate the remaining packet until its RAM address points to this stop-point, where the tag[4] bit in this RAM location is set.

Similarly for the PBERT_RX 560, it will continue generate the expecting pattern from the PBERT_RX_RAM 521 and compare them with the receiving packets. This self-stop (or conditional stop) will make sure that the pattern generation and checking is deterministic. On the other hand, if the stop control bit is used to turn off the PBERT_TX 550 and PBERT_RX 560, and to turn off the PBERT_TX 550 first (because there is channel latency between TX and RX), the PBERT_TX 550 will unconditionally stop any pattern generation even though it is in the middle of valid packet generation (i.e., not sending IDLE), but the PBERT_RX 560 will continue generating its internal packet and comparing the received data before it being turned off, it could actually compare the valid packet data with the IDLE (the PBERT_TX 550 will send IDLE after it is turned off) and cause erroneous BER results. To prevent this, the Tag[4] bit in the RAM locations can be set where it sends only IDLE.

A look-up table 602 is used to update the RAM address, its output addro_i is registered in a Next RAM address register 603. The look-up table 602 and the Next RAM address register 603 work together as the Finite-State-Machine (FSM) 529, where the look-up table 602 has the next-state logic for the RAM address, and every RAM address is analogous to a state. The Next RAM address register 603 is therefore a state memory.

Input control signals of the look-up table 602 include autoinc, which is an OR'ing of RAM_web and RAM_reb, add_load, pause, RAM_tag[1:0] signals and a rptcnt0 signal from a binary down-counter 604.

The autoinc signal is used to increment the RAM address during an MDIO 118 read or write of the PBERT RAMs 507, 521.

The addr_load signal is used to load the RAM address from the MDIO RAM address register.

The pause signal is only used in the PBERT_RX 560. In the PBERT_TX 550, and is always tied to logic 0. This signal is generated in the Packet Header Detector 525 to temporarily hold the current RAM address for the PBER-T_RX_RAM 521. This is used for synchronizing the PBER-T_RX 560 pattern self-checking with the PBERT_TX 550 pattern generation.

The RAM_tag[1:0] signals are used to control the RAM address update during pattern generation.

The rptcnt0 signal is set to HIGH when the binary down-counter 604 counts down to 0. The binary down-counter 604 is loaded for its initial count value with RAM_data[15:0] by RAM_tag[1], and starts to count down to 0. The binary down-counter 604 works as a loop counter when the PBRS generator needs to loop, to generate the PRBS (Pseudo Random Binary Sequence) pattern, or just repeatedly output an IPG (i.e., IDLE).

Table 4 shows the priority-decoding look-at table for the next RAM address update.

TABLE 4

Priority decoding table

| adr_sel[6:0] = {bene,adr_load,pause,autoinc,rptcnt0,RAM_tag[1:0] | addro_i |
|---|---|
| 7'bx_1_x_x_x_xx | RAM_addr_in |
| 7'b0_0_x_1_x_xx | addro_r + 1 |
| 7'b0_0_x_0_x_xx | addro_r |
| 7'b1_x_1_x_x_00 | addro_r |
| 7'b1_x_0_x_x_xx | addro_r + 1 |
| 7'b1_x_x_x_x_01 | 0 |

TABLE 4-continued

Priority decoding table adr_sel[6:0] =
{bene,adr_load,pause,autoinc,rptcnt0,RAM_tag[1:0]}    addro_i

| | |
|---|---|
| 7'b1_x_x_x_0_1x | addro_r |
| 7'b1_x_x_x_1_1x | addro_r + 1 |
| Default | addro_r |

There are two identical PRBS Generators (Pseudo-Random Binary Sequence counter, sometimes also called pseudo-random number counter): block 508 (in the PBERT_TX 550), and block 530 (in the PBERT_RX 560). Each of the PRBS generators 508, 530 is a 17-bit Linear Feedback Shift Register (LFSR) with all the programmable 16 taps in the feedback path. This makes it possible to generate up to $2^{16}-1$ PRBS sequences.

The seed of the LFSR is programmable and can be conditionally loaded with the control of RAM_tag[2].

The difference between loading the seed or not loading the seed during the looping of the RX PRBS generator 530 and TX PRBS generator 508 is that if loading the seed is enabled every time a PRBS pattern begins to be generated, the PRBS pattern will always start from the seed. On the other hand, if the seed is not loaded every time the PRBS pattern is generated, it will start from the state when it was stopped after the counter 604 counted down to 0. This allows the RX PRBS generator 530 and TX PRBS generator 508 to produce all the possible pseudo-random binary sequence with the current programming of the RX PRBS generator 530 and TX PRBS generator 508 taps. The RAM_tag[2] therefore provides a flexibility to control how the PRBS pattern will be repeated with the same polynomial setting. (Note that the polynomial is equivalent to the programming of all the taps).

Figure 7:
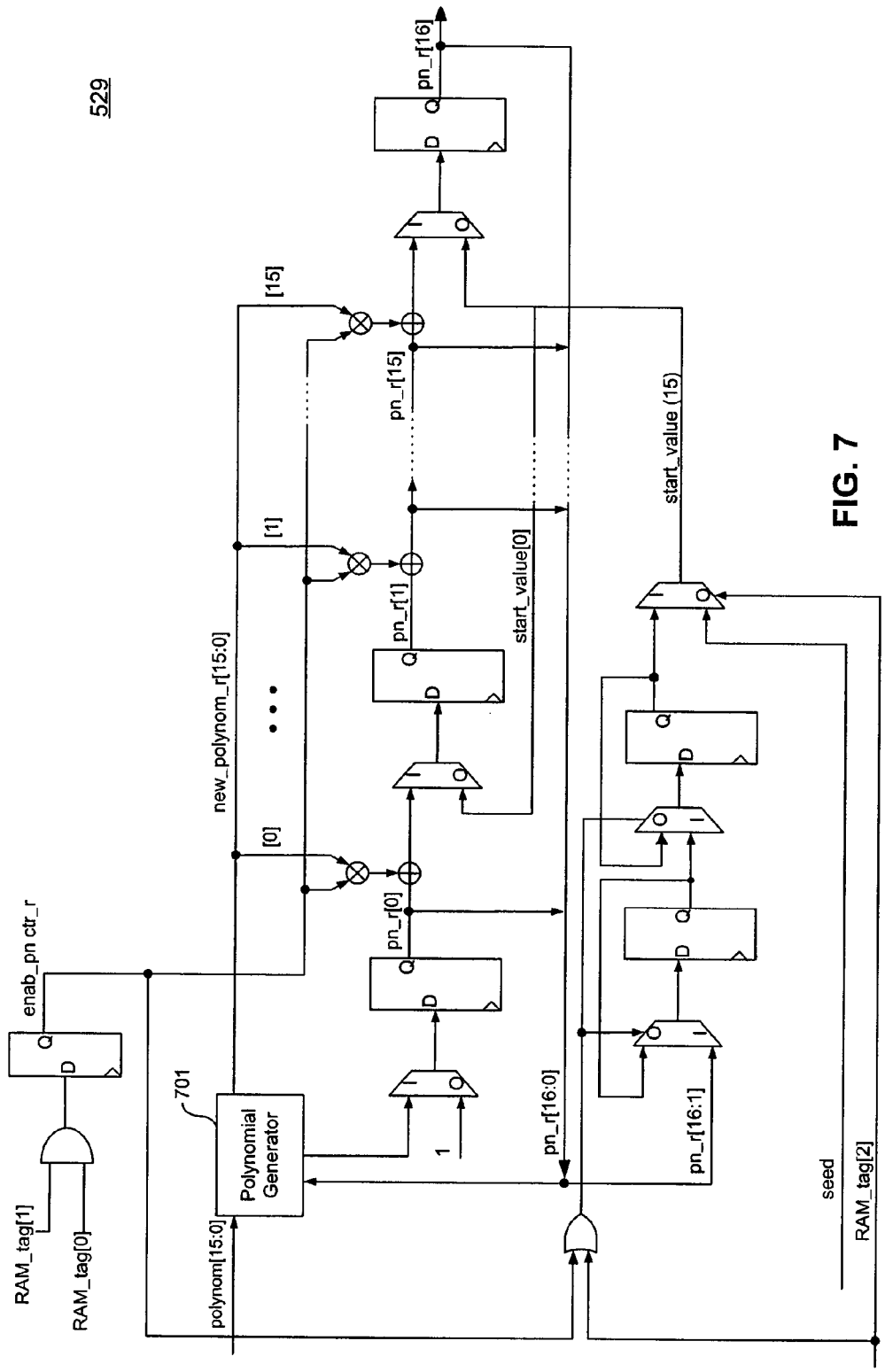
FIG. 7 is a logic schematic of a pseudo random number counter (generator).

FIG. 7 is a simplified logic schematic of the PRBS generators 508 and 530. The RAM_tag[1:0] signal is used to generate enab_pnctr_r, which is the enable signal for the PRBS generators 508 or 530. When enab_pnctr_r is set to logic 1, the feedback path of the LFSR is enabled and it can generate a Pseudo Random Binary Sequence; when enab_pnctr_r is set to logic 0, the LFSR are frozen at its current state.

A 16-bit programmable vector polynom[15:0] is used to control the order (the highest power) of the PRBS and their feedback taps, which is done in a polynominal generator 701.

The polynominal generator 701 uses the polynom [15:0] input and the current state pn_r[16:0] to map the input, the signal pn_highest_power, and all the taps, which is represented as a new_polynom[15:0] in the feedback path of LFSR. This allows generation of any PRBS with its programmable polynomial, up to the order of 16.

When the PRBS generator 508 or 530 is enabled, as the RAM_tag[1:0] of the current address becomes "11", the PRBS generator 508 or 530 will be loaded with either its previous state when it became disabled, or with the original seed, depending on the contents of RAM_tag[2]. The actual PRBS data is taken from pn_r[15:0].

The PBERT_TX 550 and PBERT_RX 560 each have their own Byte Counter and Packet Counters. For the PBERT_TX 550, the counter 509 counts how many bytes and how many packets it generates and sends to the channel for the BER test. For the PBERT_RX 560, the counter 523 counts how many bytes and packets it receives and compares.

Each byte counter 509, 523 is a 32-bit binary counter, which is incremented by 8 every cycle when the RAM_tag [3] is logic 1, indicating RAM_data[79:0] is a valid packet data (the IPG is not counted).

Each packet counter 509, 523 also has 32 bits, but it uses two 16-bit binary counters for lower 16 bits and higher 16 bits. This optimizes the logic design and allows it to run at higher speed.

Figure 8:
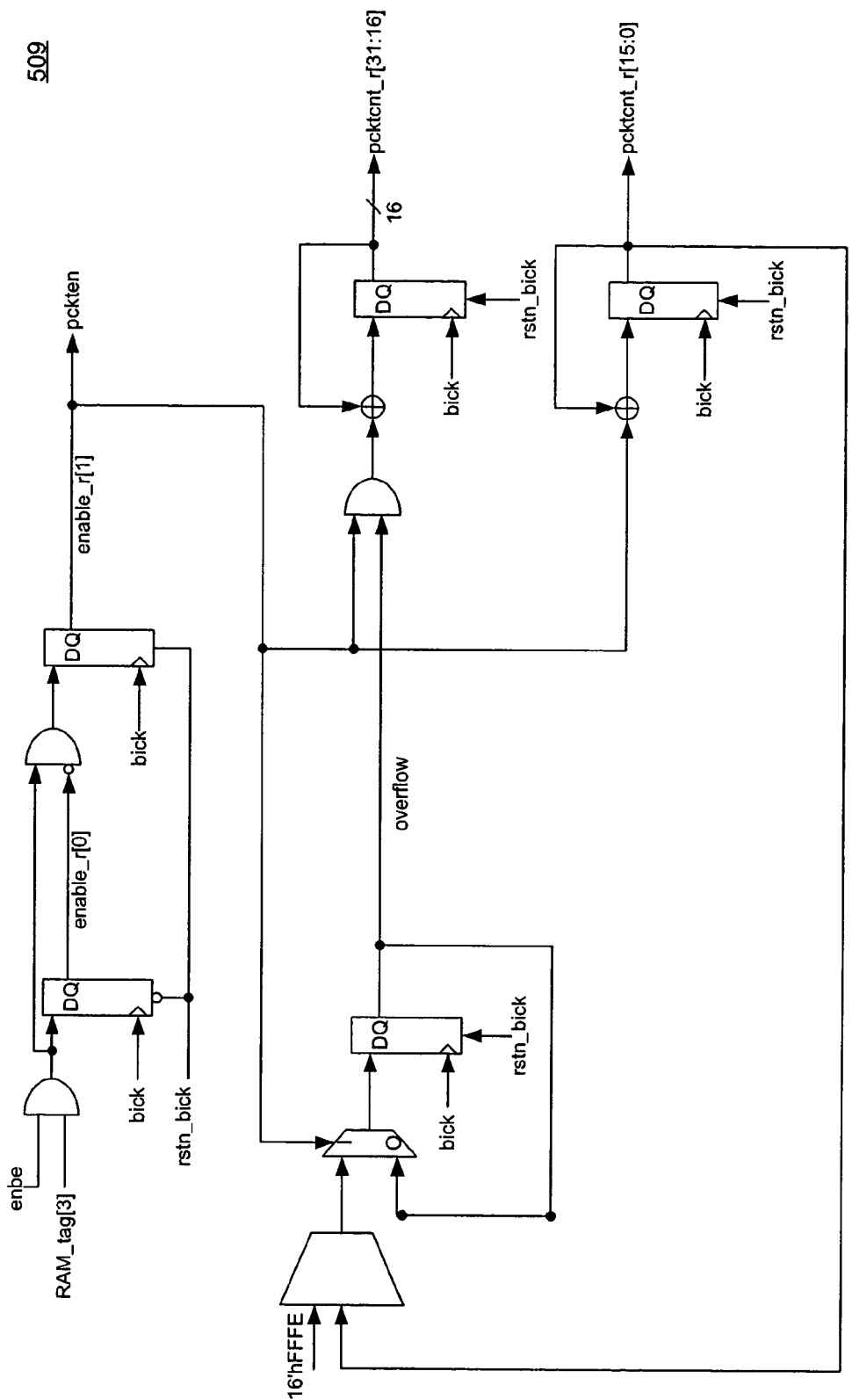
FIG. 8 shows a PBERT packet counter.

FIG. 8 illustrates a logic schematic for the PBERT Packet Counter 509. The enbe signal is generated in the PBERT Enable logic 601 to enable the PBERT for pattern and self-checking, as explained above. When enbe is HIGH, every time RAM_tag[3] bit is changed from logic 0 (not a valid packet bit) to logic 1 (a valid packet bit), the edge-detect logic will generate a one-cycle pulse (one-shot) to increment the lower 16-bit packet counter. This is different from the byte counter, because for any data within one packet (each packet is separated by IPG), we only need to count once for packet counter, while we need to count 8 bytes for each RAM_data with a valid packet bit in its RAM_tag[3]. Most of the time, only the lower 16-bit packet counter is incremented, and the higher 16-bit counter logic is, in a sense, idle. Only when the pcktcnt_r[15:0] equals to 16'hFFFE, the overflow logic will detect this condition and enable the increment of pcktcnt_r[31:16] in the same cycle when pcktcnt_r[15:0] becomes 16'h0000.

The data MUX 510 in the PBERT_TX 550 selects which data to send to the channel; and the data MUX 522 in the PBERT_RX 560 selects which data to use for self-checking. The data includes the RAM_data, IPG and PRBS data. IPG is the IDLE code, which can be programmable, but is fixed during the PBERT 112 operation. When the PBERT 112 is not enabled, the data MUX 510 always chooses the IPG to be sent out. This guarantees that the PBERT 112 will not send any invalid data to the channel when the PBERT RAM 507, 521 is being programmed. After the PBERT 112 is turned on (after programming), the RAM_tag[1:0] bits are used to select whether the RAM_data, or IPG, or PRBS data is sent out to the channel, or used for self-checking.

The Data Rate Converter 521 converts 80 bit data into two 40 bit sets of data that are aligned with a 2× faster clock, which is the running clock for the SERDES.

The Packet Header Detector 525 is used in the PBERT_RX 560 to generate pause control signal and got_marker signal indicating that the header, or SOP (Start-Of-Packet), or some other marker pattern (e.g., a CRC pattern) has been detected.

As explained in the description of RAM Address Control block 506 or 520 above, the pause control signal is used to hold the RAM address update. This logic is used to synchronize the timing between the PBERT_TX 550 pattern generation and PBERT_RX 560 pattern self-checking. During normal operation, the PBERT_RX 560 is usually enabled first. After the PBERT_RX 560 is enabled, the RAM Address Control Block 520 will update the RAM address until the RAM Address Control Block 520 points to the first valid packet bit, i.e., RAM_tag[3] =1. At this RAM location, the RAM_data has the first 8 bytes of the packet, including the SOP, that it will try to compare with the coming data from the channel under test, since there will be some latency (which is also preferred for PBERT 112 operation to make sure the PBERT_RX will not miss any packet detection).

Figure 9:
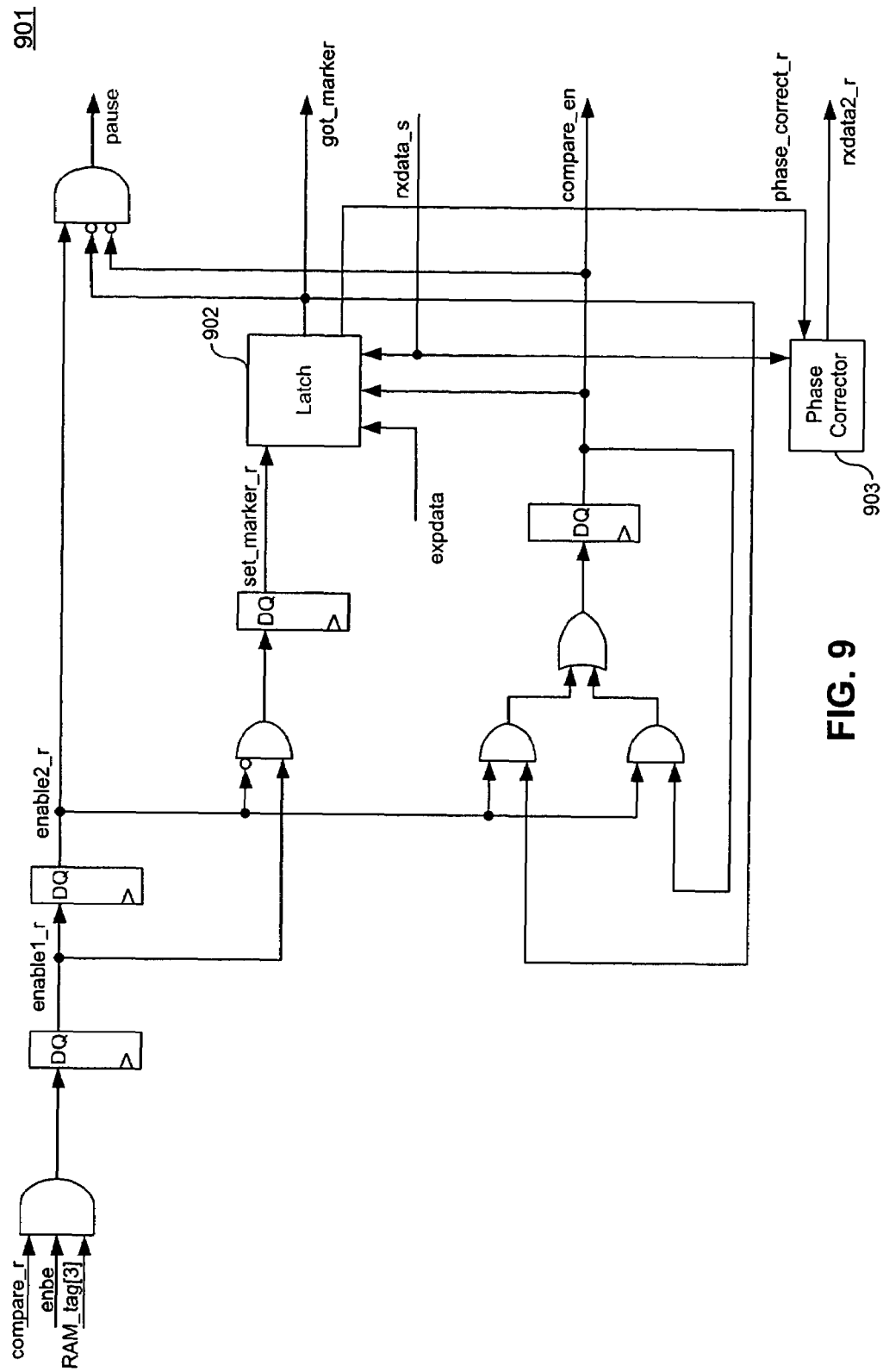
FIG. 9 shows a packet header detector.

FIG. 9 is a simplified logic schematic for Packet Header Detector 525.

During normal operation of self-checking, compare_r is set to HIGH, and enbe is set to HIGH by the RAM Address Control Block 520 after the PBERT_RX 560 is turned on. In this case, the first transition of RAM_tag[3] from logic 0 to logic 1, the edge-detect logic in the Packet Header Detector 525 generates a one-shot pulse, set_marker_r, which is used by a latch 902 to latch the second RAM_data with a valid packet bit of RAM_tag[3] before the pause control signal could hold the RAM address update. This logic makes sure that the start-sequence of self-checking properly aligns the expected data from its local RAM with the coming received data for the packet header detection.

There are two state control signals, got_marker and compare_en, which are used to control the correct sequence of the pattern self-checking operation. The two control signals got_marker and compare_en are initially reset to logic 0, so when enable2_r is set to HIGH after the first valid packet bit of RAM_tag[3] is received, the pause signal is set to HIGH, which will hold the RAM address update.

The latch 902 has the actual data-path for searching the SOP of the received data, RX_data_s by comparing with the first byte of the RAM_data that is stored by the set_marker_r pulse. It is convenient to always program the SOP on the first byte of the Lane0 during PBERT 112 test. However, due to phase corruption during the testing, when the pattern is looped back from PBERT_TX 550 to PBERT_RX 560 through the channel under test, the SOP is not necessarily always in the first byte of the Lane0. Still, the search logic will be able to find the SOP from the incoming data, and, depending on its location, will also generate the control signal, phase_correct_r, to correct the phase. The logic of phase_correct_r is relatively simple. When the SOP is found from the RX_data_s but is not at the first byte as programmed in the PBERT RAM 507, 521, phase_correct_r is set to HIGH.

A phase corrector 903 takes the received data from the shift-registers 528 in the receive path at the top-level block diagram of PBERT_RX 560. The phase-corrected data RX_data2_r will be used by Bit-Error-Comparator for BER test.

Figure 10:
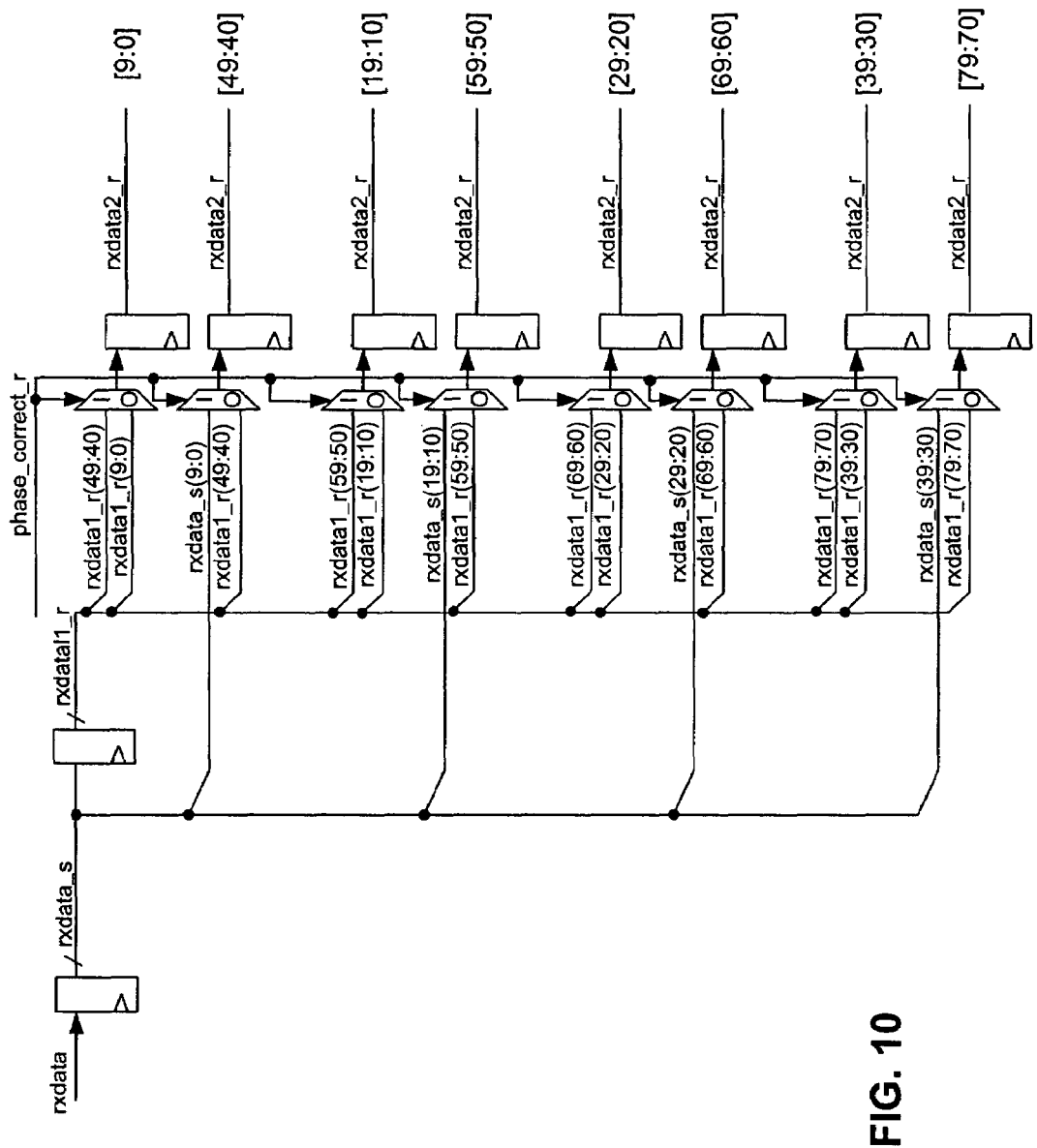
FIG. 10 shows a phase corrector.

FIG. 10 is a logic schematic of the phase corrector 903, which shows the logic of the phase correction. The actual phase correction is based on the fact that there could be 180-degree phase shift when the packet is looped back from the channel under test.

TABLE 5 received data without phase corruption

| | clock cycle | | | |
|---|---|---|---|---|
| | n − 1 | n | n + 1 | n + 2 | ... |
| Lane 0 | SOP | D4 | D8 | D12 | ... |
| Lane 1 | D1 | D5 | D9 | D13 | ... |
| Lane 2 | D2 | D6 | D10 | D14 | ... |
| Lane 3 | D3 | D7 | D11 | D15 | ... |

TABLE 6 received data with phase corruption

| | clock cycle | | | |
|---|---|---|---|---|
| | n − 1 | n | n + 1 | n + 2 | ... |
| Lane 0 | I | SOP | D4 | D8 | ... |
| Lane 1 | I | D1 | D5 | D9 | ... |
| Lane 2 | I | D2 | D6 | D10 | ... |
| Lane 3 | I | D3 | D7 | D11 | ... |

As shown in Table 6, when there is a phase corruption, RX_data1_r={D3, D2, D1, SOP, I, I, I, I}, and RX_data_s={D1, D10, D9, D8, D7, D6, D5, D4}, so the phase correction is done by combining the higher 40 bits of data from RX_data1_r with lower 40 bits of RX_data_s, as the lower 40 bits and higher 40 bits of RX_data2_r every cycle. This produces the corrected RX_data2_r={D7, D6, D5, D4, D3, D2, D1, SOP}, which matches the data programmed in the PBERT RAM 507.

Figure 11:
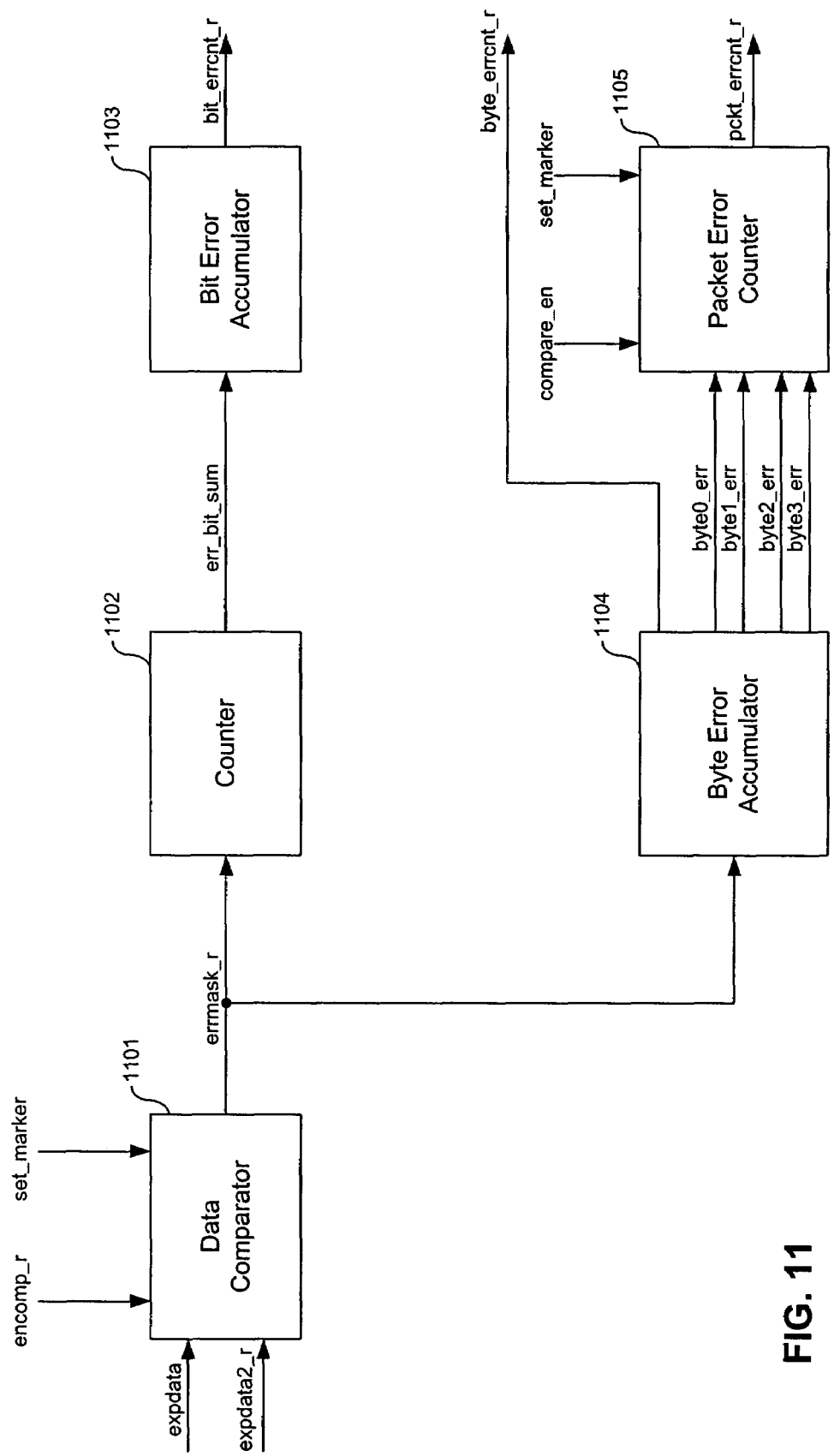
FIG. 11 shows a bit error test logic.

FIG. 11 shows a block diagram of bit-error-test logic that is inside the bit_err_comparator block 527 of the PBERT_RX 560. A data comparator 1101 performs a logic exclusive-OR between expdata and the phase-corrected received data RX_data2_r when the compare_en is set to HIGH by the Packet Header Detector 525. The set_marker control signal is also used to store the first two expdata when the valid packet bit of RAM_tag[3] becomes 1 before the Packet Header Detector 525 finds the SOP from RX_data_s. Otherwise the first two expdata will be lost, and the wrong BER results will be generated. The expdata is coming from the PBERT data MUX 522, which in this case could be either RAM_data or the PRBS pattern, and the expdata2_r is the two-cycle-delayed data of expdata. However, the first data packet must be a RAM data packet before the PRBS pattern can actually be generated and compared, the first data packet from the RAM_data is also used to sync the PBERT_TX 550 and PBERT_RX 560.

The output of the data comparator 1101, errmask_r, is an 80-bit wide exclusive-OR result. This 80-bit wide data is processed by counter 1102, which counts the bit-error number for the current data comparison. Each logic 1 of the 80-bit wide data indicates a mismatch, or a bit error, and the counter 1102 needs to count up to 80 bit errors in one clock cycle.

A bit error accumulator 1103 accumulates the number of bit errors from the output of the counter 1102, designated as err_bit_sum.

A byte error accumulator 1104, in each clock cycle, will first count how many bytes have some error bits. Then it will check for each byte from errmask_r: if any bit is a logical 1 in each byte, then this byte will be counted as an error byte. There could be as many as 8 byte errors for the current received 80-bit data, by adding all the eight 1-bit signals that detects each byte error, the total byte error number is produced. This byte error number is then used to accumulate the total byte error counts during the PBERT 112 test. The Byte error accumulator 1104 also generates four control signals: byte0_err, byte1_err, byte2_err, and byte3_err, indicating that there is a byte error on Lane0, Lane1, Lane2 and Lane3 of the SERDES channel under test. These four signals are then used by the Packet Error Counter 1105 to update the packet error count.

Figure 12:
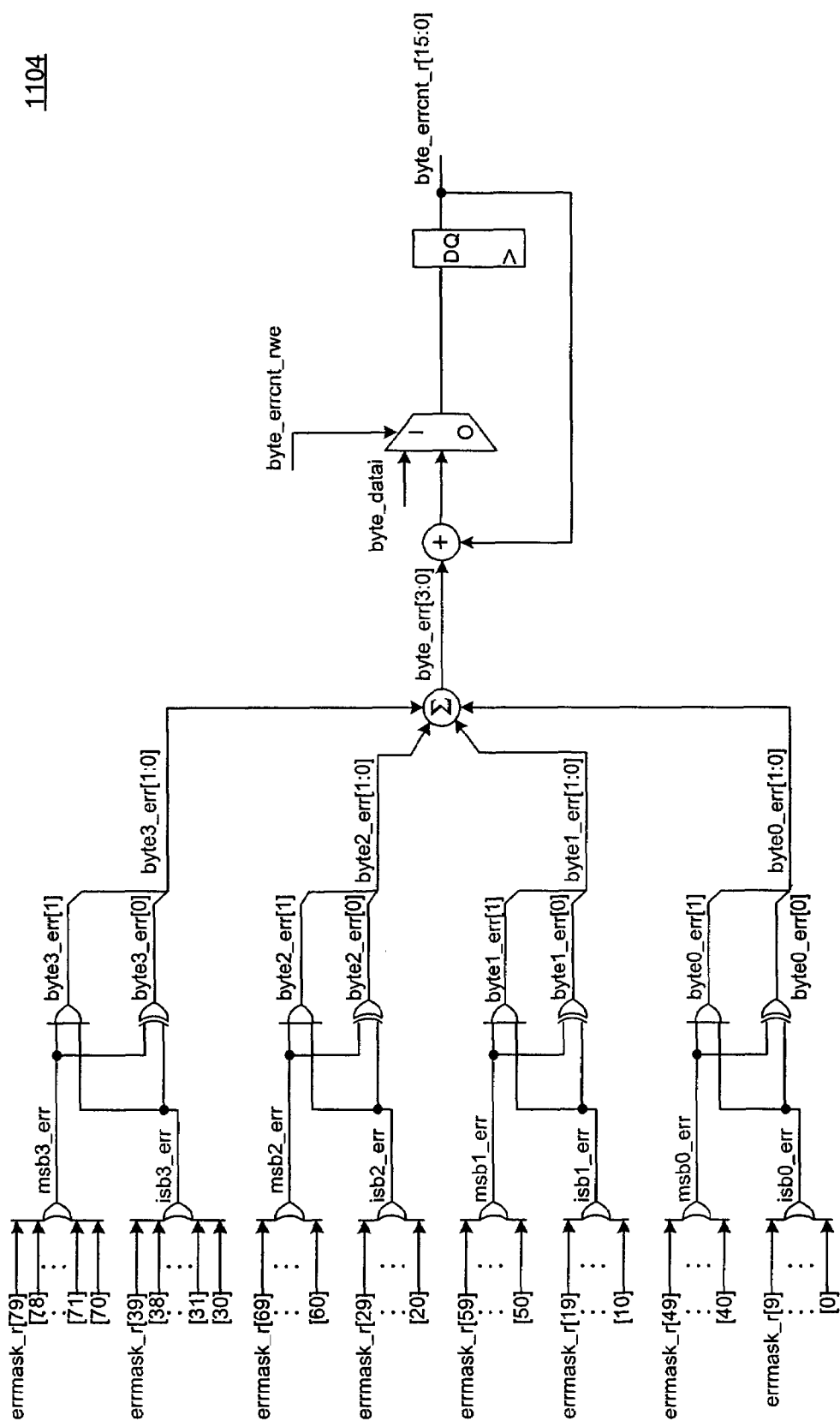
FIG. 12 shows a byte error accumulator.

FIG. 12 shows the logic of the byte-error accumulator 1104. It is important to use efficient logic and maximum parallelism to generate the byte3_err, byte2_err, byte1_err and byte_0_err signals, which count the byte errors of all lanes. These results can then be summed and accumulated for the total byte error count.

The Packet Error Counter 1105 uses the byte0_err, byte1_err, byte2_err and byte3_err signals to find any byte errors that occur in the current received data and only increment the packet error counter once for the current packet. In this design, it is important to count only once for the first occurrence of the byte error.

Figure 13:
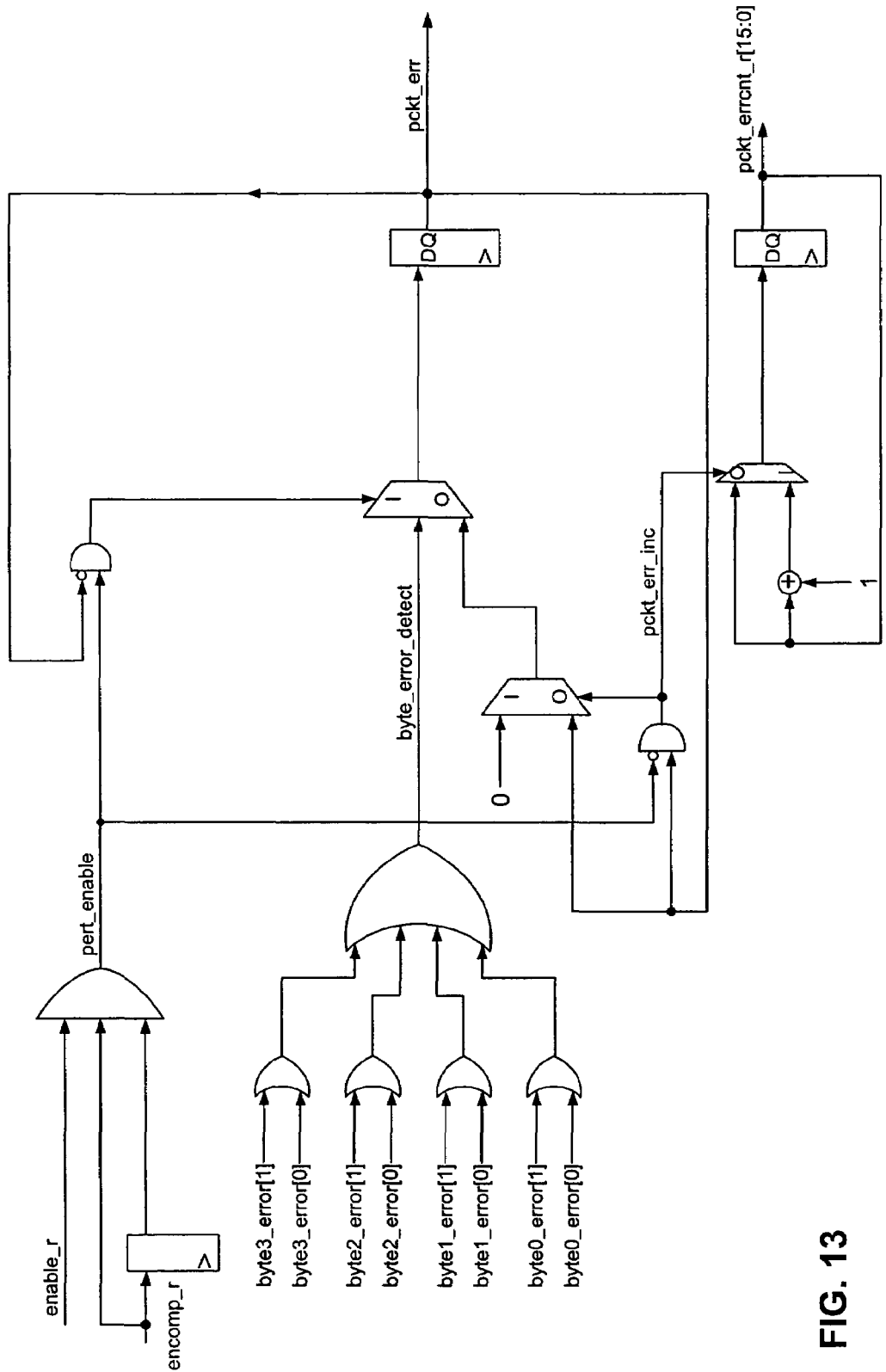
FIG. 13 shows a packet error counter.

FIG. 13 shows the logic design of the Packet Error Counter 1105. The Packet Error Counter 1105 is only active when both enable2_r and compare_en are set to HIGH, indicating the valid packet checking, and the Packet Header Detector 525 has already received the packet that is expected to be the same as what is stored in its local memory. The byte3_err, byte2_err, byte1_err and byte0_err are used in parallel to detect any byte errors in the current received data, and the result is the signal byte_err_detect. A state variable called pckt_err is initially reset to logical 0. During the self-checking for the current packet, the first transition of byte_err_detect will trigger the pckt_err to logical 1. After pckt_err is set to logical 1, its feedback logic will mask out any further detection of byte_err_detect, and pckt_err will hold its current state, which is a logical 1, indicating a byte error has already been detected. At the end of the current packet detection, pckt_enable will becomes LOW, which will then set the pckt_err_inc to be HIGH for only one clock cycle. As soon as pckt_err_inc is set to HIGH, the pckt_err will be automatically reset, and the feedback logic will make pckt_err_inc LOW again. This one-shot signal of pckt_err_inc will enable the pckt_errcnt_r to increment once at the end of the current packet checking if any byte error has been detected.

The PBERT_RX 550 can be programmed to capture the received packets. There are four capture modes that can be performed:

Capture mode 1: capture the received packet after a programmable marker is detected;

Capture mode 2: capture the received packet after a detected marker pattern is lost;

Capture mode 3: capture the received packet unconditionally after it is enabled;

Capture mode 4: capture the received packet when the bit error is detected.

Capture mode 4 requires that the PBERT_RX_RAM 521 function as a dual-port.

The Packet Marker Detector 526 is similar to the Packet Header Detector 525 except that in the capture modes, the detection of a marker can be programmed to take place during a search of any of the four lanes (or some other number of lanes).

Figure 14:
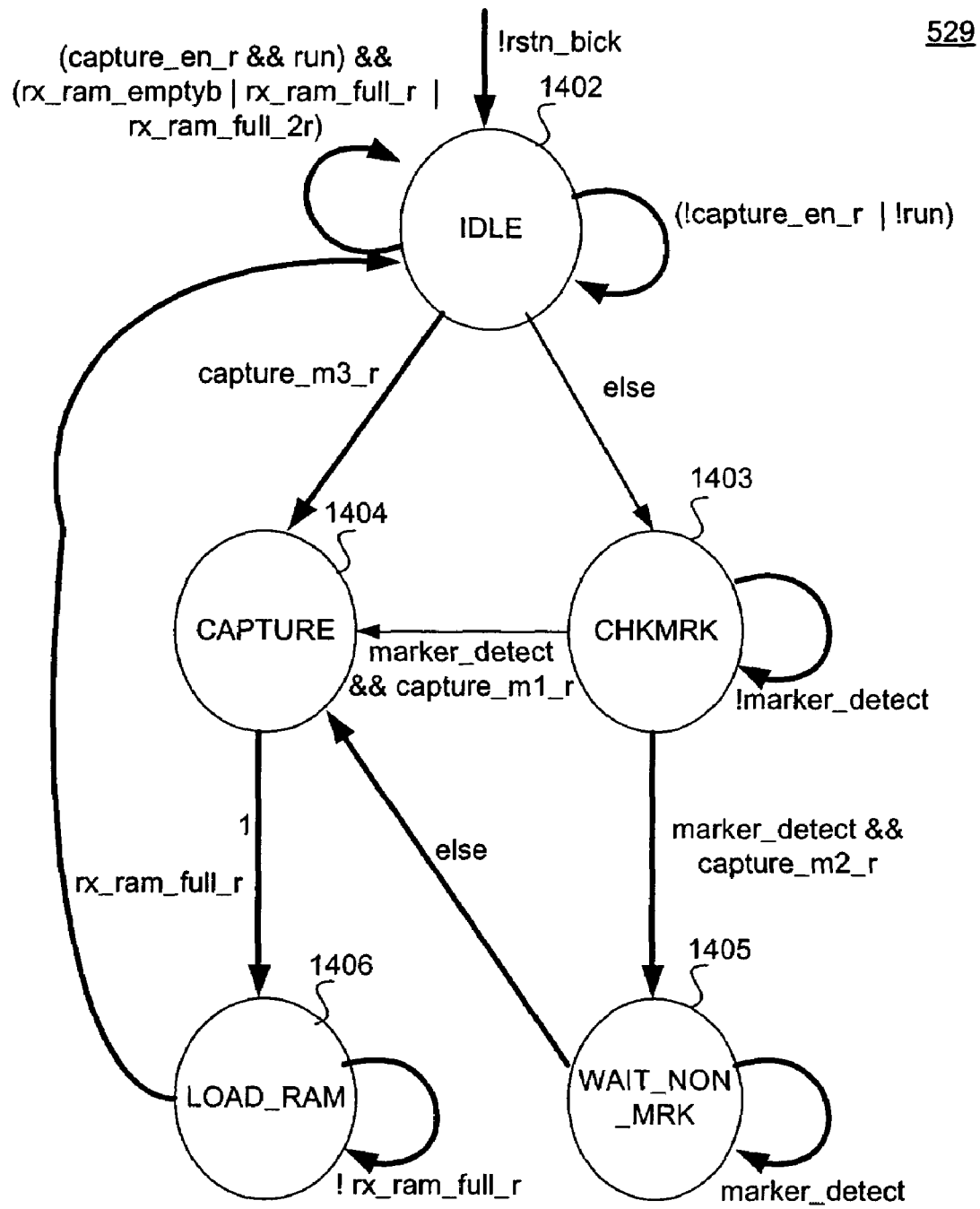
FIG. 14 shows a state diagram of a capture Finite State Machine.

FIG. 14 depicts a state diagram for the Capture FSM 529 that controls the different capture mode.

The Capture Controller (FSM 529) is at its IDLE state (1402) after reset or the capture is done when the RAM is full and it will remain this state as long as the capture mode is not enabled, or the run bit has not been set.

In the beginning, the control bits of RX_RAM_emptyb and RX_RAM_full_r, RX_RAM_full_2r are all reset to logic 0, so after the capture mode is programmed and run bit is set to HIGH, the FSM will comes to next states of either Capture state (1404) or Chkmrk state (1403).

If capture mode 3 is programmed, which is an unconditional capture mode, the FSM 529 will go to the Capture state 1404 directly. Otherwise the FSM 529 will go to the Chkmrk state 1403, where it will check the results from Packet Marker Detect block. When marker_detect is set to HIGH, indicating that the first marker has been detected, the FSM 529 will go to either the Capture state 1404 when it is programmed with capture mode 1, or it will go the Wait_non_mrk state 1405 when it is programmed with capture mode 2.

In the Wait_non_mrk state 1405, the FSM 529 will continue check the marker_detect signal and will remain in this state as long as marker_detect is HIGH, indicating the detection of a marker pattern. It will go to the Capture state 1404 when marker_detect becomes LOW, indicating losing the marker from the received data.

When the FSM 529 is in the Capture State 1404, it will start to initialize the capture logic for RAM loading with the received data and will unconditionally go to the Load_RAM in the next cycle.

When the FSM 529 is in the Load_RAM state, it will load the PBERT_RX_RAM with the received data until the RAM is full, and it will come back to the IDLE state 1402 again.

The FSM 529 then will remain in the IDLE state 1402 until the RX_RAM_emptyb control bit has been reset from the MDIO interface 118.

This control bit is set to HIGH when the capture RAM becomes full so the FSM 529 knows that current capture is done and the RAM data can be read out for further analysis.

Conclusion

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An integrated circuit, comprising:
    a substrate;
    a plurality of data ports disposed on the substrate; and
    an integrated packet bit error rate tester disposed on the substrate for testing a channel coupled to one of the plurality of data ports, including
        a packet transmit circuit including a first memory for storing transmit bit error rate test packet data, wherein the packet transmit circuit is coupled to the channel under test;
        a packet receive circuit including a second memory for storing received packet compare data and coupled to the channel under test; and
        an interface for programming the packet transmit circuit and the packet receive circuit;
    wherein said packet transmit circuit and said packet receive circuit are deposited on said substrate;
    wherein the packet transmit circuit generates an arbitrary packet pattern in response to a command from the interface; and
    wherein the packet receive circuit determines a bit error rate of the channel under test.

2. The integrated circuit of claim 1, wherein the packet transmit circuit includes a first pseudo-random number generator for generating the arbitrary packet pattern.

3. The integrated circuit of claim 2, wherein the packet receive circuit includes a second pseudo-random number generator for generating the same arbitrary packet pattern that is generated by the first pseudo-random number generator.

4. The integrated circuit of claim 1, wherein
the packet transmit circuit includes a byte counter for counting a number of bytes transmitted during bit error rate testing;
the integrated packet bit error rate tester is coupled to the plurality of data ports via a ring bus disposed on the substrate; and
the substrate is a CMOS substrate.

5. The integrated circuit of claim 1, wherein the packet transmit circuit includes a packet counter for counting a number of packets transmitted during bit error rate testing.

6. The integrated circuit of claim 1, wherein the packet receive circuit includes a bit error counter for counting a number of bit errors detected during bit error rate testing.

7. The integrated circuit of claim 1, wherein the packet receive circuit includes a byte error counter for counting a number of bytes with at least one bit in error detected during bit error rate testing.

8. The integrated circuit of claim 1, wherein the packet receive circuit includes a packet error counter for counting a number of packets with at least one byte in error detected during bit error rate testing.

9. The integrated circuit of claim 1, wherein the second memory captures the received packet compare data only after a pre-programmed pattern is detected.

10. The integrated circuit of claim 9, wherein the pre-programmed pattern includes a fixed pattern.

11. The integrated circuit of claim 9, wherein the pre-programmed pattern includes a programmable pattern.

12. The integrated circuit of claim 9, wherein the pre-programmed pattern includes a cyclic redundancy check pattern.

13. The integrated circuit of claim 1, wherein the arbitrary packet pattern is received from an external random access memory.

14. The integrated circuit of claim 1, wherein the arbitrary packet pattern can be loaded into a random access memory for bit error rate testing.

15. The integrated circuit of claim 1, wherein the second memory captures the received packet compare data only after a pre-programmed pattern is lost.

16. The integrated circuit of claim 1, wherein the second memory captures the received packet compare data only after an error is detected.

17. The integrated circuit of claim 1, wherein the second memory captures the received packet compare data continuously.

18. The integrated circuit of claim 1, further including a finite state machine for controlling capture of the received packet compare data.

19. The integrated circuit of claim 1, wherein the packet receive circuit includes a byte counter for counting a total number of bytes received.

20. The integrated circuit of claim 1, wherein the packet receive circuit includes a packet counter for counting a total number of packets received.

21. The integrated circuit of claim 1, wherein the packet transmit circuit includes a byte counter for counting a total number of bytes transmitted.

22. The integrated circuit of claim 1, wherein the packet transmit circuit includes a packet counter for counting a total number of packets transmitted.

23. The integrated circuit of claim 1, wherein the arbitrary packet pattern is a ten gigahertz serializer/deserializer packet.

24. An integrated circuit, comprising:
a substrate;
a plurality of data ports disposed on the substrate; and
an integrated packet bit error rate tester disposed on the substrate for testing a channel coupled to one of the plurality of data ports, including
a packet transmit circuit including a first memory for storing transmit bit error rate test packet data, wherein the packet transmit circuit is coupled to the channel under test;
a packet receive circuit including a second memory for capturing received packet compare data from the channel under test; and
an interface for programming the packet transmit circuit and the packet receive circuit;
wherein said packet transmit circuit and said packet receive circuit are deposited on said substrate;
wherein the packet transmit circuit generates an arbitrary serializer/deserializer (SERDES) packet pattern in response to a command from the interface; and
wherein the packet receive circuit determines a bit error rate of the channel under test based on the transmit packet data compared to the receive packet data.

25. The integrated circuit of claim 24, wherein the packet receive circuit includes a byte counter for counting a total number of bytes received and the second memory is configured to capture a received data packet after a pre-programmed pattern is detected.

26. The integrated circuit of claim 24, wherein the packet receive circuit includes a packet counter for counting a total number of packets received.

27. The integrated circuit of claim 24, wherein the packet transmit circuit includes a byte counter for counting a total number of bytes transmitted.

28. The integrated circuit of claim 24, wherein the packet transmit circuit includes a packet counter for counting a total number of packets transmitted.

29. The integrated circuit of claim 24, wherein the packet transmit circuit includes a first pseudo-random number generator for generating the arbitrary SERDES packet pattern.

30. The integrated circuit of claim 29, wherein the packet receive circuit includes a second pseudo-random number generator for generating the same arbitrary SERDES packet pattern that is generated by the first pseudo-random number generator.

31. The integrated circuit of claim 29, wherein the second memory captures the received packet data only after a pre-programmed pattern is detected.

32. The integrated circuit of claim 31, wherein the pre-programmed pattern includes a fixed pattern.

33. The integrated circuit of claim 31, wherein the pre-programmed pattern includes a programmable pattern.

34. The integrated circuit of claim 31, wherein the pre-programmed pattern includes a cyclic redundancy check pattern.

35. The integrated circuit of claim 24, wherein the second memory captures the received packet data only after a pre-programmed pattern is lost.

36. The integrated circuit of claim 24, wherein the second memory captures the received packet data only after an error is detected.

37. The integrated circuit of claim 24, wherein the second memory captures the received packet data continuously.

38. A method of testing a bit error rate of a channel coupled to a transmitter memory that is part of an integrated circuit deposited on a substrate and to a receiver that is part of the integrated circuit deposited on the substrate, comprising:

generating a test packet including an arbitrary marker pattern;

loading the test packet into the transmitter memory in the integrated circuit;

transmitting the test packet from the transmitter memory over the channel;

capturing a received test packet from the channel coupled to the integrated circuit; and determining the bit error rate of the channel based on the received test packet.

39. The method of claim 38, further including generating an arbitrary ten gigahertz serializer/deserializer (10G SERDES) packet pattern.

40. The method of claim 39, further including generating the arbitrary 10G SERDES packet pattern using a first pseudo-random number generator.

41. The method of claim 39, further including programming the arbitrary 10G SERDES packet pattern through a management data input/output interface.

42. The method of claim 39, further including generating the same arbitrary 10G SERDES packet pattern using a second pseudo-random number generator as the 10G SERDES packet pattern generated by the first pseudo-random number generator.

43. The method of claim 38, further including counting a number of bytes received during the bit error rate testing.

44. The method of claim 38, further including counting a number of packets received during the bit error rate testing.

45. The method of claim 38, further including counting a number of bit errors detected during the bit error rate testing.

46. The method of claim 38, further including counting a number of bytes with errors detected during the bit error rate testing.

47. The method of claim 38, further including counting a number of packets with a byte in error detected during the bit error rate testing.

48. The method of claim 38, further including determining a bit error rate of the channel under test.

49. The method of claim 38, further including counting a number of packets transmitted over the channel.

50. The method of claim 38, further including counting a number of number of bytes transmitted over the channel.

* * * * *

UNITED STATES PATENT AND TRADEMARK OFFICE
CERTIFICATE OF CORRECTION

| | | |
|---|---|---|
| PATENT NO. | : 7,373,561 B2 | Page 1 of 1 |
| APPLICATION NO. | : 10/681244 | |
| DATED | : May 13, 2008 | |
| INVENTOR(S) | : Howard A. Baumer et al. | |

It is certified that error appears in the above-identified patent and that said Letters Patent is hereby corrected as shown below:

In column 17, line 32, "redundancy cheek" should be replaced with --redundancy check--.

Signed and Sealed this

Nineteenth Day of May, 2009

JOHN DOLL
*Acting Director of the United States Patent and Trademark Office*